United States Patent
Akai et al.

(10) Patent No.: US 12,240,285 B2
(45) Date of Patent: Mar. 4, 2025

(54) SENSORY EVALUATION SYSTEM, SUSPENSION DEVICE, AND SUSPENSION CONTROL SYSTEM

(71) Applicant: Hitachi Astemo, Ltd., Hitachinaka (JP)

(72) Inventors: Akihito Akai, Tokyo (JP); Yuji Chiba, Tokyo (JP); Nobuyuki Ichimaru, Hitachinaka (JP); Ryusuke Hirao, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 556 days.

(21) Appl. No.: 17/436,896

(22) PCT Filed: Mar. 5, 2020

(86) PCT No.: PCT/JP2020/009538
§ 371 (c)(1),
(2) Date: Sep. 7, 2021

(87) PCT Pub. No.: WO2020/203026
PCT Pub. Date: Oct. 8, 2020

(65) Prior Publication Data
US 2022/0134831 A1 May 5, 2022

(30) Foreign Application Priority Data
Mar. 29, 2019 (JP) .................. 2019-066885

(51) Int. Cl.
*B60G 17/0165* (2006.01)
*B60G 17/018* (2006.01)
*G01M 17/04* (2006.01)

(52) U.S. Cl.
CPC ....... *B60G 17/0165* (2013.01); *B60G 17/018* (2013.01); *B60G 2400/204* (2013.01);
(Continued)

(58) Field of Classification Search
CPC ............. B60G 17/0165; B60G 17/018; B60G 2400/204; B60G 2400/208;
(Continued)

(56) References Cited

U.S. PATENT DOCUMENTS 8,733,746 B1 * 5/2014 Lamberti ............... B60G 11/22
267/141
2015/0338313 A1 * 11/2015 Tanaka ................ G01M 17/007
701/32.8
(Continued)

FOREIGN PATENT DOCUMENTS

DE 10 2008 013 249 A1 4/2009
JP H06-156037 A 6/1994
(Continued)

OTHER PUBLICATIONS

International Search Report with English translation and Written Opinion issued in corresponding application No. PCT/JP2020/009538 dated May 12, 2020.
(Continued)

*Primary Examiner* — Erin M Piateski
*Assistant Examiner* — Brian E Yang
(74) *Attorney, Agent, or Firm* — Foley & Lardner LLP

(57) ABSTRACT

A sensory evaluation system performs sensory evaluation on a plurality of sensory indexes corresponding to respective feelings of an occupant according to traveling of a moving body, and includes: a data adjustment unit that generates evaluation data to be used for the sensory evaluation based on information acquired according to the traveling of the moving body; an evaluation index determination unit that selects at least any one sensory index as an evaluation index from among the plurality of sensory indexes based on the information; an evaluation unit that calculates an evaluation value for the evaluation index from the evaluation data using
(Continued)

an evaluation circuit corresponding to the evaluation index; and an aggregation unit that aggregates the evaluation value calculated by the evaluation unit.

8 Claims, 15 Drawing Sheets

(52) U.S. Cl.
CPC ............ *B60G 2400/208* (2013.01); *B60G 2400/821* (2013.01); *B60G 2401/14* (2013.01); *B60G 2500/10* (2013.01); *G01M 17/04* (2013.01)

(58) Field of Classification Search
CPC .......... B60G 2400/821; B60G 2401/14; B60G 2500/10; B60G 2206/99; B60G 2600/1878; B60G 17/015; G01M 17/04; G01M 17/007; G06N 3/084; B60W 40/08
See application file for complete search history.

(56) References Cited

U.S. PATENT DOCUMENTS

| | | | |
|---|---|---|---|
| 2017/0225697 A1* | 8/2017 | Hallonet | B60G 17/0165 |
| 2018/0231982 A1* | 8/2018 | Yunoki | G05D 1/0061 |
| 2019/0359025 A1* | 11/2019 | Wager | B60G 21/005 |
| 2021/0023904 A1* | 1/2021 | Kasuya | B60G 17/016 |

FOREIGN PATENT DOCUMENTS

| | | |
|---|---|---|
| JP | H07-244065 A | 9/1995 |
| JP | 2012-251913 A | 12/2012 |
| JP | 2015-161587 A | 9/2015 |
| JP | 2015161587 * | 9/2015 |

OTHER PUBLICATIONS

Office Action issued in corresponding Korean Patent Application No. 10-2021-7024186 with English Machine Translation dated Jan. 25, 2023 (11 pages).
Office Action issued in corresponding Japanese Patent Application No. 2019-066885 dated Aug. 17, 2021 with English translation.
Conggan Ma et al., "Sound Quality Evaluation of the Interior Noise of Pure Electric Vehicle Based on Neural Network Model", IEEE Transactions on Industrial Electronics, Dec. 2017, pp. 9442-9450, vol. 64, No. 12, ISSN 0278-0046 (10 pages).
Fengnan Huang et al., "Study on the Evaluation Model of Vehicle Comfort Based on the Neural Network", IFAC Papers Online Conference Paper Archive, 2018, pp. 553-558, from $5^{th}$ IFAC Conference (Sep. 2018) ISSN 2405-8963 (6 pages).
Office Action issued in corresponding German Patent Application No. 112020000531.3, with English Machine Translation dated Aug. 7, 2023 (7 pages).

* cited by examiner

| NN OUTPUT | EVALUATION VALUE |
|---|---|
| a31 | 9.00 |
| a32 | 8.75 |
| a33 | 8.50 |
| a34 | 8.25 |
| a35 | 8.00 |
| a36 | 7.75 |
| ⋮ | ⋮ |
| a3K | 5.00 |

(EXAMPLE) K=17

| SENSORY INDEX | NUMBER OF INPUT LAYER ELEMENTS (I) | NUMBER OF HIDDEN LAYER ELEMENTS (J) | NUMBER OF OUTPUT LAYER ELEMENTS (K) |
|---|---|---|---|
| FLAT FEELING Flat feeling | 2400 | 100 | 17 |
| HARSHNESS Harshness | 1200 | 200 | 17 |
| STROKE FEELING Stroke Feeling | 1000 | 250 | 17 |
| ⋮ | ⋮ | ⋮ | ⋮ |
| PLUSHNESS Plushness | 3000 | 500 | 17 |

FIG. 7
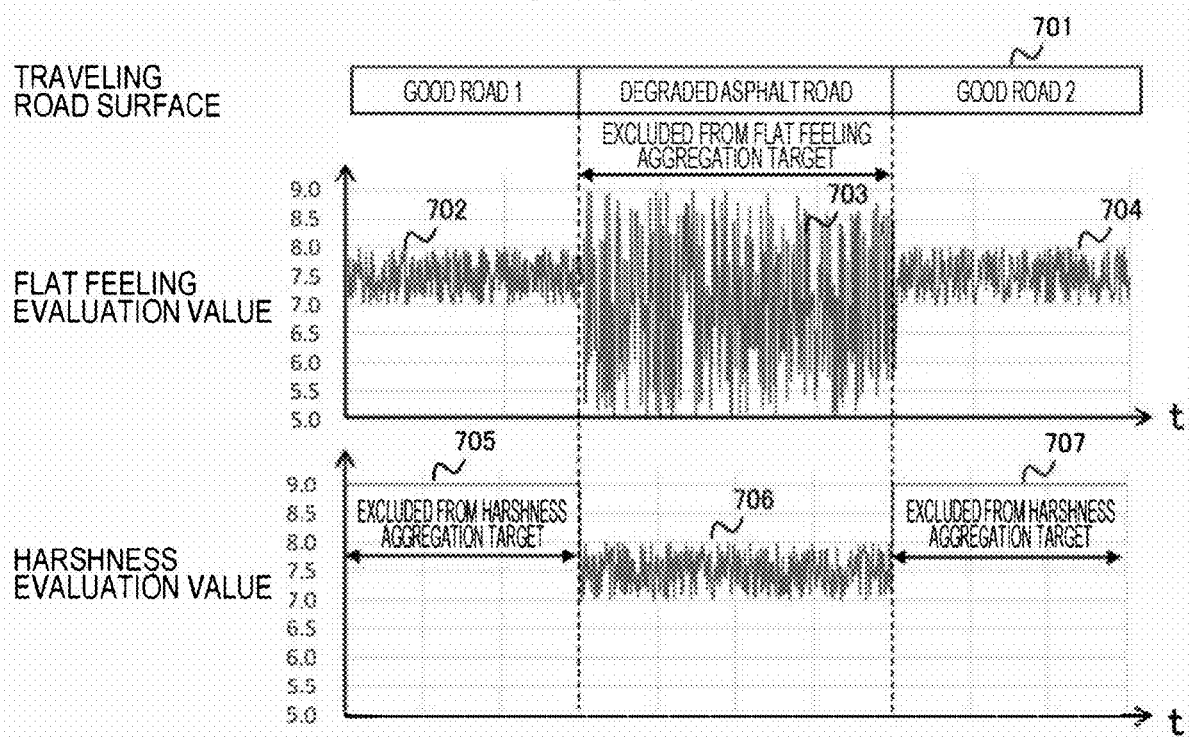
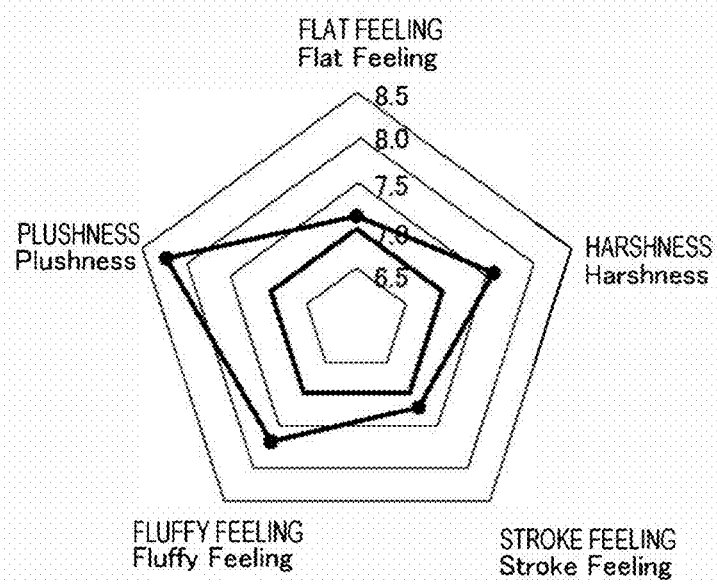
FIG. 8(a)
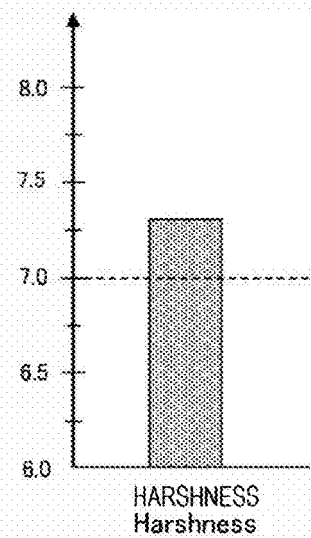
FIG. 8(b)

| NN OUTPUT (SENSORY INDEX No.) | SENSORY INDEX |
|---|---|
| 1 | FLAT FEELING Flat feeling |
| 2 | HARSHNESS Harshness |
| 3 | STROKE FEELING Stroke feeling |
| : | : |
| N | PLUSHNESS Plushness |

SENSORY EVALUATION SYSTEM, SUSPENSION DEVICE, AND SUSPENSION CONTROL SYSTEM

TECHNICAL FIELD

The present invention relates to a sensory evaluation system, and a suspension device and a suspension control system using the sensory evaluation system.

BACKGROUND ART

A vibration stimulus generated by a tire passing through unevenness of a road surface or the like in a traveling vehicle is attenuated by a suspension of the vehicle and transmitted to an occupant via a chassis or a seat. Therefore, damping characteristics of the suspension greatly affect the ride comfort felt by the occupant. Conventionally, in automobile manufacturers that manufacture vehicles, evaluators such as specially trained expert drivers have performed sensory evaluation on ride comfort at the time of actually driving a vehicle, and adjusted a suspension or the like by reflecting a result of the evaluation to improve the ride comfort.

As a technique for automatically performing the above-described sensory evaluation on the ride comfort instead of the evaluators, for example, a technique described in PTL 1 is known. PTL 1 discloses a movement evaluation method for performing movement evaluation by detecting jerk and acceleration of a moving object using a jerk sensor and inputting the detected jerk and acceleration to a neural network that has learned sensory evaluation obtained when a human gets on the object as a teacher signal.

CITATION LIST

Patent Literature

PTL 1: JP H7-244065 A

SUMMARY OF INVENTION

Technical Problem

There are a plurality of types of indexes related to sensory evaluation on ride comfort, and the ride comfort is generally evaluated by balance of an evaluation value for each index. However, the conventional technique described in PTL 1 does not take this point into consideration, and thus, the optimal ride comfort is not always derived even if a high evaluation result is obtained by the sensory evaluation. Therefore, there is a demand for a sensory evaluation technique capable of obtaining an evaluation result contributing to improvement of ride comfort.

Solution to Problem

A sensory evaluation system according to the present invention performs sensory evaluation on a plurality of sensory indexes corresponding to respective feelings of an occupant according to traveling of a moving body, and includes: a data adjustment unit that generates evaluation data to be used for the sensory evaluation based on information acquired according to the traveling of the moving body; an evaluation index determination unit that selects at least any one sensory index as an evaluation index from among the plurality of sensory indexes based on the information; an evaluation unit that calculates an evaluation value for the evaluation index from the evaluation data using an evaluation circuit corresponding to the evaluation index; and an aggregation unit that aggregates the evaluation value calculated by the evaluation unit.

A suspension device according to the present invention is manufactured based on the evaluation value output from the sensory evaluation system.

A suspension control system according to the present invention includes: the above-described sensory evaluation system; and a suspension damping force variable mechanism that adjusts a damping force of a suspension device mounted on the moving body based on the evaluation value output from the sensory evaluation system.

Advantageous Effects of Invention

According to the present invention, it is possible to provide the sensory evaluation technique capable of obtaining the evaluation result contributing to the improvement of the ride comfort.

BRIEF DESCRIPTION OF DRAWINGS

FIG. 7 is a view illustrating an example of a relationship between a traveling road surface and an output waveform of an evaluation circuit in the first embodiment of the present invention.

FIGS. 8(a) and 8(b) are views illustrating an example of a sensory evaluation result displayed on an in-vehicle display unit.

DESCRIPTION OF EMBODIMENTS

First Embodiment

A first embodiment of the present invention will be described hereinafter with reference to FIGS. 1 to 10.

Figure 1:
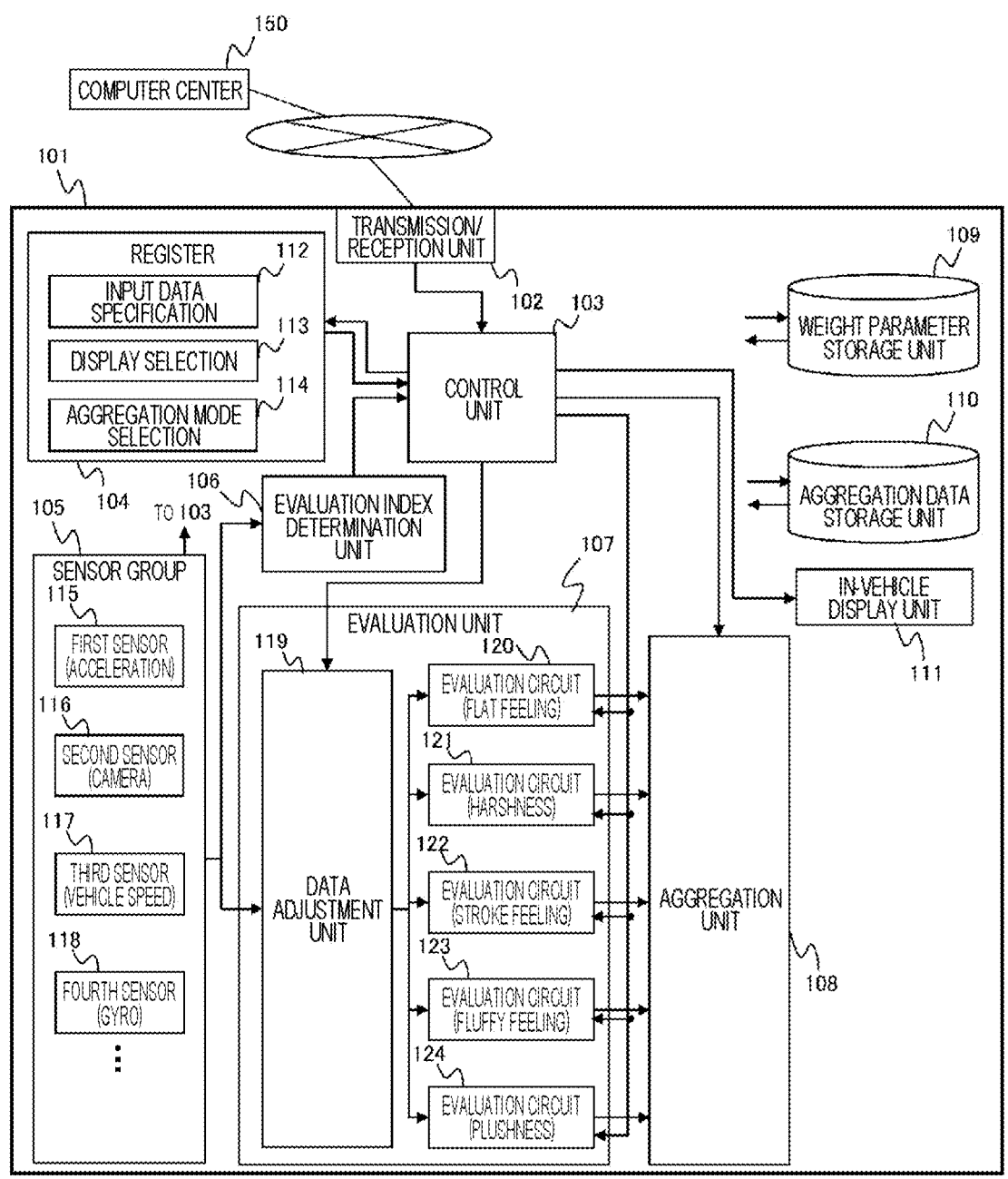
FIG. 1 is a block diagram illustrating a functional configuration of a sensory evaluation system according to a first embodiment of the present invention.

FIG. 1 is a block diagram illustrating a functional configuration of a sensory evaluation system according to the first embodiment of the present invention. A sensory evaluation system 101 illustrated in FIG. 1 is a system that performs sensory evaluation using a plurality of types of sensory indexes regarding feelings of an occupant according to traveling of a moving body, such as an automobile, for example, ride comfort and steering stability felt by the occupant. The sensory evaluation system 101 includes the respective functional blocks of a transmission/reception unit 102, a control unit 103, a register 104, a sensor group 105, an evaluation index determination unit 106, an evaluation unit 107, an aggregation unit 108, a weight parameter storage unit 109, an aggregation data storage unit 110, and an in-vehicle display unit 111. Note that the moving body which is equipped with the sensory evaluation system 101 and is subjected to sensory evaluation is referred to as a "host vehicle" in the following description.

The transmission/reception unit 102 is connected to a computer center 150 via a network, such as the Internet, receives learning data transmitted from the computer center 150, and outputs the learning data to the control unit 103. Examples of the learning data include evaluation index determination data used when the evaluation index determination unit 106 selects a sensory index (evaluation index) to be evaluated for each type of a road surface from among the plurality of types of sensory indexes, evaluation circuit data used in each evaluation circuit, which will be described later, included in the evaluation unit 107, and the like. For example, in a sensory evaluation test performed in advance by an evaluator, such as a specially trained expert driver, the computer center 150 aggregate sensor information acquired from various sensors mounted on a vehicle to be evaluated, evaluation indexes answered by the evaluator for the respective types of road surfaces, and evaluation values for the respective evaluation indexes, and obtains relationships thereof by machine learning, such as deep learning to generate the learning data. Then, the generated learning data is transmitted to the sensory evaluation system 101 in response to a request from the sensory evaluation system 101. The learning data transmitted from the computer center 150 is received by the transmission/reception unit 102 in the sensory evaluation system 101 and output to the control unit 103.

The control unit 103 has a function of controlling operations of the respective functional blocks constituting the sensory evaluation system 101 to a cooperative operation. That is, the respective functional blocks of the sensory evaluation system 101 operate in accordance with the control of the control unit 103, whereby sensory evaluation as will be described later is executed in the sensory evaluation system 101. The control unit 103 is configured using, for example, a microcomputer.

The register 104 is a part that stores parameters used in the respective functional blocks present in the sensory evaluation system 101, and is configured using, for example, a RAM. The register 104 includes an input data specification register 112, a display selection register 113, and an aggregation mode selection register 114, which are classified according to types of parameters to be stored.

The sensor group 105 is the functional block including a plurality of types of sensors mounted on the host vehicle. The sensor group 105 includes, for example, a first sensor 115 that is an acceleration sensor, a second sensor 116 that is a camera, a third sensor 117 that is a vehicle speed sensor, and a fourth sensor 118 that is a gyro sensor. The sensor group 105 uses these sensors to acquire road surface information on a road surface on which the host vehicle travels and acceleration information and angular velocity information on an acceleration and an angular velocity according to a movement state of the host vehicle as the sensor information according to traveling of the host vehicle. Specifically, for example, the acceleration information is acquired by the first sensor 115, and the angular velocity information is acquired by the fourth sensor 118. In addition, a captured image obtained by capturing the road surface around the host vehicle by the second sensor 116 is acquired as road surface information. Note that the sensor group 105 may include a radar or the like configured to grasp a surrounding environment on the front side although not illustrated in FIG. 1. In addition, the first sensor 115 is preferably mounted at a plurality of locations of the host vehicle. For example, it is conceivable to mount the first sensor 115 on each of portions constituting a chassis of the host vehicle, such as an unsprung portion and a sprung portion constituting a suspension of the host vehicle, the periphery of a seat where the occupant sits, and a steering held by a driver, and to acquire pieces of acceleration information of the respective portions.

The evaluation index determination unit 106 selects any of the plurality of sensory indexes as an evaluation index based on sensor information on the surrounding environment of the host vehicle among pieces of the sensor information acquired by the sensor group 105. Specifically, for example, a road surface state around the host vehicle is determined based on the road surface information acquired by the second sensor 116, which is the camera, and a sensory index according to the road surface state is selected as the evaluation index. Specifically, for example, in a case where a flat feeling and harshness are used as sensory indexes in the sensory evaluation system 101, the flat feeling is selected as the evaluation index and the harshness is not selected when the host vehicle travels on a newly paved road. Conversely, when the vehicle travels on a road such as a dirt road surface, the harshness is selected as the evaluation index without selecting the flat feeling. In other words, based on the sensory indexes, types of road surfaces to be evaluated exist for the respective sensory indexes. Therefore, it is preferable that the evaluation index determination unit 106 acquire road surface information on a road surface on the front side when the host vehicle is traveling, and determine a sensory index to be selected as the evaluation index based on the road surface information. For example, the evaluation index can be selected in association with any of the sensory indexes based on a frequency distribution when the road surface information is developed in a time direction, pattern matching based on a relationship between road surface shape data acquired as the road surface information and a preset evaluation index, a relationship with an evaluation index acquired by learning, or the like.

The evaluation unit 107 includes a data adjustment unit 119 and evaluation circuits 120 to 124. The data adjustment unit 119 generates evaluation data used by the evaluation circuits 120 to 124 based on pieces of the sensor information on the acceleration and the angular velocity of the host vehicle from among pieces of the sensor information acquired by the sensor group 105. The evaluation circuits 120 to 124 correspond to respective different sensory indexes, and calculate an evaluation value for each of the sensory indexes based on the evaluation data input from the data adjustment unit 119. In the present embodiment, it is assumed that the sensory evaluation system 101 performs the sensory evaluation using five types of sensory indexes of a flat feeling, harshness, a stroke feeling, a fluffy feeling, and plushness, and the evaluation circuits 120 to 124 corresponding to the respective sensory indexes are provided in the evaluation unit 107. That is, the evaluation circuit 120, the evaluation circuit 121, the evaluation circuit 122, the evaluation circuit 123, and the evaluation circuit 124 correspond to the flat feeling, the harshness, the stroke feeling, the fluffy feeling, and the plushness, respectively, and calculate respective evaluation values for these sensory indexes. Note that each evaluation circuit has a different target sensory index, and thus, a specification of evaluation data may be different for each evaluation circuit.

The specification of the evaluation data input from the data adjustment unit 119 to each evaluation circuit is determined based on a parameter value stored in the input data specification register 112 included in the register 104. Preferably, the parameter value can be updated by receiving update information transmitted from the outside by the transmission/reception unit 102.

Parameters used when the evaluation circuits 120 to 124 calculate the respective evaluation values are stored in the weight parameter storage unit 109. Since the five types of sensory indexes are assumed in the present embodiment as described above, the weight parameter storage unit 109 has a capacity capable of storing parameters for five sets. Note that the parameter referred to herein corresponds to, for example, a coefficient of a calculation formula used in the evaluation circuits 120 to 124. In addition, for example, when each of the evaluation circuits 120 to 124 is realized using a hierarchical neural network, information on a weight Wij of a connection between elements in each neural network is stored in the weight parameter storage unit 109.

The aggregation unit 108 aggregates the evaluation values calculated by the evaluation circuits 120 to 124. Note that the types of road surfaces to be evaluated exist for the respective sensory indexes in the sensory evaluation system 101 of the present embodiment as described above. Therefore, when the host vehicle travels on a road surface that is not an evaluation target, there is a possibility that an appropriate evaluation value is not output from the evaluation circuits 120 to 124. Thus, the aggregation unit 108 uses only an evaluation value output from an evaluation circuit corresponding to a sensory index selected as an evaluation index among the evaluation circuits 120 to 124 as an aggregation target based on a determination result of the evaluation index by the evaluation index determination unit 106. As a result, the evaluation values output by the evaluation circuits 120 to 124 when the host vehicle travels on the road surface to be evaluated are aggregated, and the evaluation value for the road surface that is not the evaluation target can be excluded. In this manner, the aggregation unit 108 classifies the evaluation values into the evaluation target/non-evaluation target, and writes the evaluation values, which have not been excluded, into the aggregation data storage unit 110 together with time stamps. When the sensory evaluation by the sensory evaluation system 101 is completed, the aggregation unit 108 reads and aggregates the evaluation values stored in the aggregation data storage unit 110, and outputs and displays a result of the aggregation on the in-vehicle display unit 111. As a result, a result of the sensory evaluation is presented to the occupant of the host vehicle.

Note that the aggregation result of the evaluation values aggregated by the aggregation unit 108 and displayed on the in-vehicle display unit 111 may be an instantaneous value or a time average value of evaluation values at any timing, or may be an average value of evaluation values for each evaluation index when the host vehicle travels in a predetermined road section. For example, any method by which the aggregation unit 108 aggregates the evaluation values is determined based on the information stored in the aggregation mode selection register 114 included in the register 104. The occupant of the host vehicle can arbitrarily select a method for aggregating evaluation values by setting an aggregation mode by operating an operation switch (not illustrated) or the like.

The in-vehicle display unit 111 displays the aggregation result of evaluation values obtained by the aggregation unit 108 on a screen as the sensory evaluation result of the sensory evaluation system 101, and presents the aggregation result to the occupant of the host vehicle. Note that a type of a sensory index for displaying the sensory evaluation result on the in-vehicle display unit 111 is determined based on the information stored in the display selection register 113 included in the register 104. The occupant of the host vehicle can arbitrarily select the type of the sensory index to be displayed on the in-vehicle display unit 111 by operating an operation switch (not illustrated) or the like.

Figure 2:
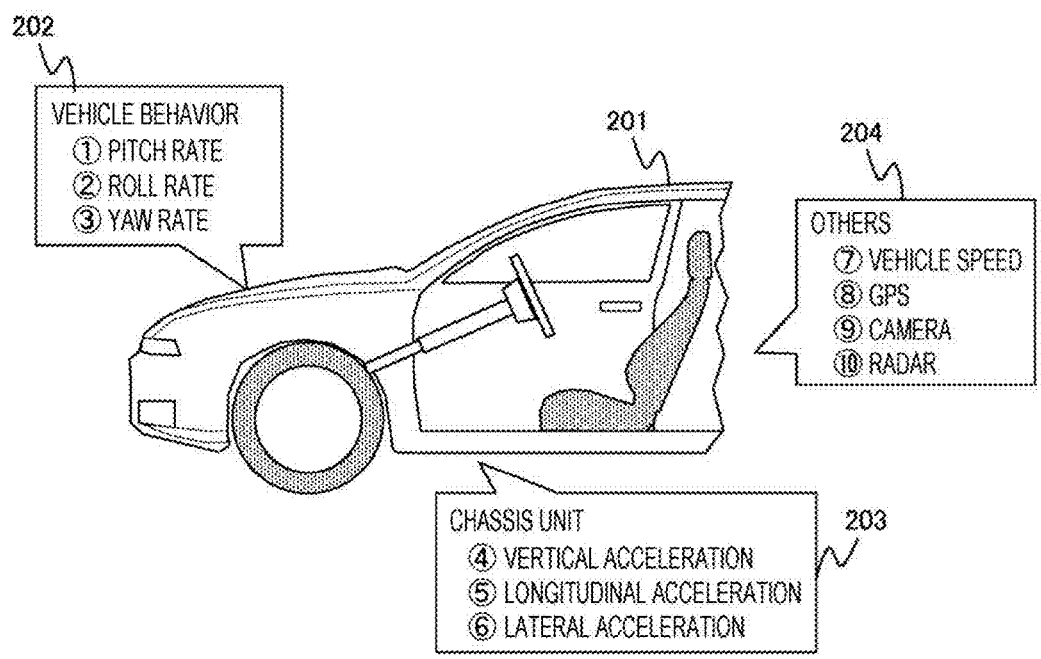
FIG. 2 is a view illustrating an example of sensor information.

FIG. 2 is a view illustrating an example of sensor information acquired by the sensor group 105. In FIG. 2, the sensory evaluation system 101 of FIG. 1 is mounted on the host vehicle 201. In the sensory evaluation system 101, the sensor group 105 acquires pieces of sensor information as indicated by reference signs 202, 203, and 204, for example. The sensor information 202 is an example of sensor information related to a behavior of the host vehicle, and is acquired by, for example, the fourth sensor 118. The sensor information 203 is an example of sensor information in a chassis unit of the host vehicle, and is acquired by, for example, the first sensor 115. The sensor information 204 is an example of other sensor information, and is acquired by, for example, the second sensor 116, the third sensor 117, a GPS sensor (not illustrated), a radar, or the like. In particular, it is preferable that the sensor information 203 of the chassis unit include a whole or a part of acceleration data related to a path through which a stimulus from a road surface input via a tire reaches the occupant. For example, it is possible to acquire, as the sensor information 203, accelerations of an unsprung portion and a sprung portion constituting a suspension, the periphery of a seat where the occupant sits, a tie rod of a steering, the steering, and the like. Note that measurement points other than the portions described here may be used as long as the sensory evaluation aimed by the present invention can be realized.

Figure 3:
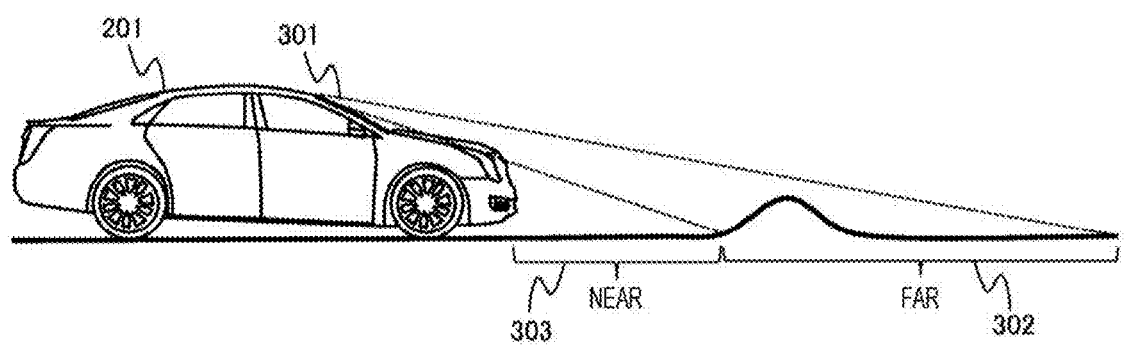
FIG. 3 is a view illustrating a relationship between pieces of sensor information used in an evaluation index determination unit and an evaluation circuit according to the first embodiment of the present invention.

FIG. 3 is a view illustrating a relationship between pieces of sensor information used in the evaluation index determination unit 106 and the evaluation circuits 120 to 124 according to the first embodiment of the present invention.

In FIG. 3, the sensory evaluation system 101 of FIG. 1 is mounted on a host vehicle 201. In the sensory evaluation system 101, the second sensor 116, which is the camera in the sensor group 105, can capture an image of a visual field range 301, for example, and acquires road surface information of a road surface 302 on the far side corresponding to the visual field range 301. At this time, the evaluation index determination unit 106 refers to the road surface information of the road surface 302 acquired by the second sensor 116 and selects one or more of the plurality of sensory indexes as the evaluation index. Meanwhile, the evaluation circuits 120 to 124 calculate evaluation values for the respective sensory indexes based on evaluation data, generated by the data adjustment unit 119 based on the acceleration information and the angular velocity information acquired by the first sensor 115 and the fourth sensor 118 with respect to the road surface 303 located closer to the host vehicle than the road surface 302. Note that the second sensor 116 may be either a stereo camera or a monocular camera as long as road surface information on the front side of a traveling road of the host vehicle can be acquired. In addition, a sensor other than the camera, for example, a radar or the like may be used as the second sensor 116 to acquire the road surface information on the front side of the traveling road of the host vehicle.

Figures 4A, 4B:
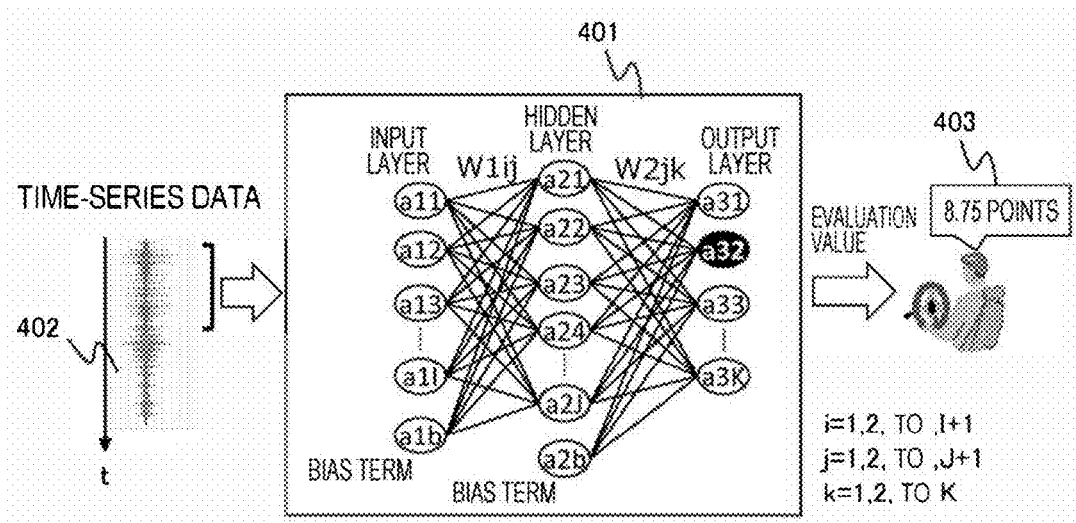
FIGS. 4(a) and 4(b) are views illustrating an example of an evaluation circuit in the first embodiment of the present invention.

FIGS. 4(a) and 4(b) are views illustrating an example of an evaluation circuit according to the first embodiment of the present invention. FIG. 4(a) is a view illustrating an example of an evaluation circuit using a hierarchical neural network having time-series data of sensor information as an input and an evaluation value for a sensory index as an output, and FIG. 4(b) is a table illustrating a relationship between the output of the evaluation circuit and the evaluation value.

In FIG. 4(a), an evaluation circuit 401 corresponding to the evaluation circuits 120 to 124 illustrated in FIG. is configured using a hierarchical neural network having a three-layer configuration in which elements of an input layer (the number of elements I+1), a hidden layer (the number of elements J+1), and an output layer (the number of elements K) are hierarchically coupled. Note that one element representing a bias term is set for each of the input layer and the hidden layer as illustrated in FIG. 4(a). Each element of the input layer and each element of the hidden layer are coupled with a weight W1ij (i=1 to +1, j=1 to J+1), and each element of the hidden layer and each element of the output layer are coupled with a weight W2jk (j=1 to J 1, k=1 to K). These pieces of weight information are stored in the weight parameter storage unit 109 as described above.

Time-series data 402 is data obtained by dividing data of sensor information, output from each sensor of the sensor group 105 at a predetermined cycle, every fixed period and processing the divided data as one data string. The time-series data 402, generated as evaluation data by the data adjustment unit 119 based on sensor information acquired from each of one or more types of sensors among the sensors constituting the sensor group 105, is input to the evaluation circuit 401 for each sensor type. Specifically, for example, in a case where a sampling rate of each sensor is 100 Hz and an attention period (window width) of the time-series data 402 is 500 msec, data of 50 points (=100 Hz×0.5 sec) for one sensor is input to the evaluation circuit 401 as the time-series data 402. In this case, for example, if the number of types of sensors corresponding to the evaluation circuit 401 is ten types, the number of elements of the input layer of the evaluation circuit 401 is set to I=500 (=50 points×10 types) except for the above-described bias term. Then, the window width is shifted in the time-axis direction, so that the time-series data 402 of the road surface on which the host vehicle travels can be acquired every fixed period, and the evaluation value can be calculated by the evaluation circuit 401.

Assuming that the highest point of the evaluation value is 9.00, the lowest point is 5.00, and am interval of points is 0.25 as illustrated in FIG. 4(b), the number of output layer elements at this time is K=17. In this case, for example, when an evaluator, such as an expert driver, replied that an evaluation value when the vehicle travels on a certain road surface is 8.75 points in a sensory evaluation test performed in advance, the evaluation circuit 401 may be configured such that only an output layer element a32 corresponding to the evaluation value outputs one with respect to an input of the time-series data 402 acquired from the road surface, and the other output layer elements output zero. Based on such input/output specifications, the evaluation circuit 401 can be configured by learning a correlation between a large amount of the time-series data 402 and evaluation values answered by the expert driver by machine learning to construct a hierarchical neural network. In the machine learning of the neural network, for example, a generally known method such as back propagation can be used.

Note that the number of elements in each layer of the input layer, the hidden layer, and the output layer, and magnitudes of the weights W1ij and W2jk coupling the respective elements are preferably set to optimum values for each corresponding sensory index in the evaluation circuit 401. That is, when the evaluation circuits 120 to 124 of FIG. 1 are configured using the hierarchical neural network such as the evaluation circuit 401 of FIG. 4(a), the number of elements of each layer and the magnitude of the weight in the evaluation circuits 120 to 124 may be different for each evaluation circuit. In addition, the number of layers of the neural network is three in the example of FIG. 4(a), but the number of layers may be other than three. In the evaluation circuits 120 to 124, a neural network can be configured using an arbitrary number of layers for each evaluation circuit.

In addition, a specification of the time-series data 402 generated as the evaluation data for the evaluation circuits 120 to 124 by the data adjustment unit 119 may be the same or different for each evaluation circuit. For example, the evaluation data can be generated by varying a time range (window width) for acquiring the time-series data 402 or a time interval (sampling rate) of the time-series data 402 for each evaluation circuit. In this manner, each evaluation circuit can acquire optimal time-series data for each corresponding sensory index. Furthermore, spectrum data representing a frequency component of the time-series data 402, or data obtained by processing the time-series data 402 or the spectrum data may be generated as the evaluation data.

Figures 5A, 5B:
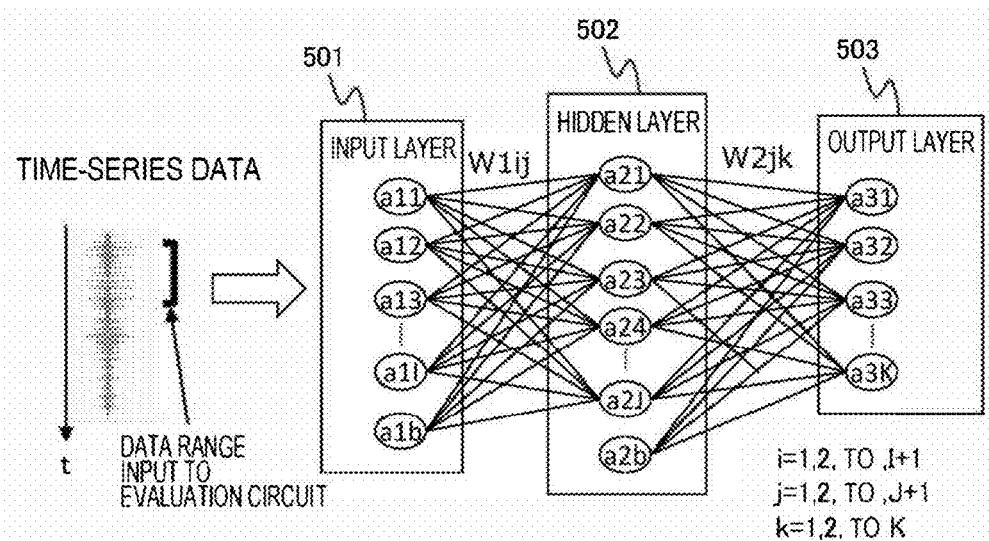
FIGS. 5(a) and 5(b) are views illustrating an example of an evaluation circuit for each sensory index in the first embodiment of the present invention.

FIGS. 5(a) and 5(b) are views illustrating an example of an evaluation circuit for each sensory index in the first embodiment of the present invention. FIGS. 5(a) and 5(b) illustrate features of the evaluation circuits 120 to 124 of FIG. 1 constituting the sensory evaluation system 101 of the present embodiment. FIG. 5(a) is a view illustrating a relationship among an input layer, a hidden layer, and an output layer of a hierarchical neural network, and FIG. 5(b) is a table illustrating an example of a relationship between a sensory index and the number of elements of each of the input layer, the hidden layer, and the output layer.

The evaluation circuit illustrated in FIG. 5(a) is configured using a hierarchical neural network in which an input layer 501, a hidden layer 502, and an output layer 503 are hierarchically coupled, similarly to the evaluation circuit

401 of FIG. 4(*a*). Note that evaluation circuits are set for respective sensory indexes as in the evaluation circuits 120 to 124 in FIG. 1 in the sensory evaluation system 101 of the present embodiment. As described above, one of the features of the present invention is to make specifications of these evaluation circuits different.

FIG. 5(*b*) illustrates an example of a specification for each evaluation circuit. For example, the evaluation circuit corresponding to the flat feeling, that is, the evaluation circuit 120 in FIG. 1 has the number of input layer elements I=2400 and the number of hidden layer elements J=100, and the evaluation circuit corresponding to the harshness, that is, the evaluation circuit 121 in FIG. 1, has the number of input layer elements I=1200 and the number of hidden layer elements J=200. In addition, the evaluation circuit corresponding to the stroke feeling, that is, the evaluation circuit 122 in FIG. 1 has the number of input layer elements I=1000 and the number of hidden layer elements J=250, and the evaluation circuit corresponding to the plushness, that is, the evaluation circuit 124 in FIG. 1, has the number of input layer elements I=3000 and the number of hidden layer elements J=500. Note that the number of output layer elements is K in all the evaluation circuits. However, these parameter values are merely examples, and may be other parameter values. In the present embodiment, it is important that the specification of the evaluation circuit be different for each sensory index.

Figure 6:
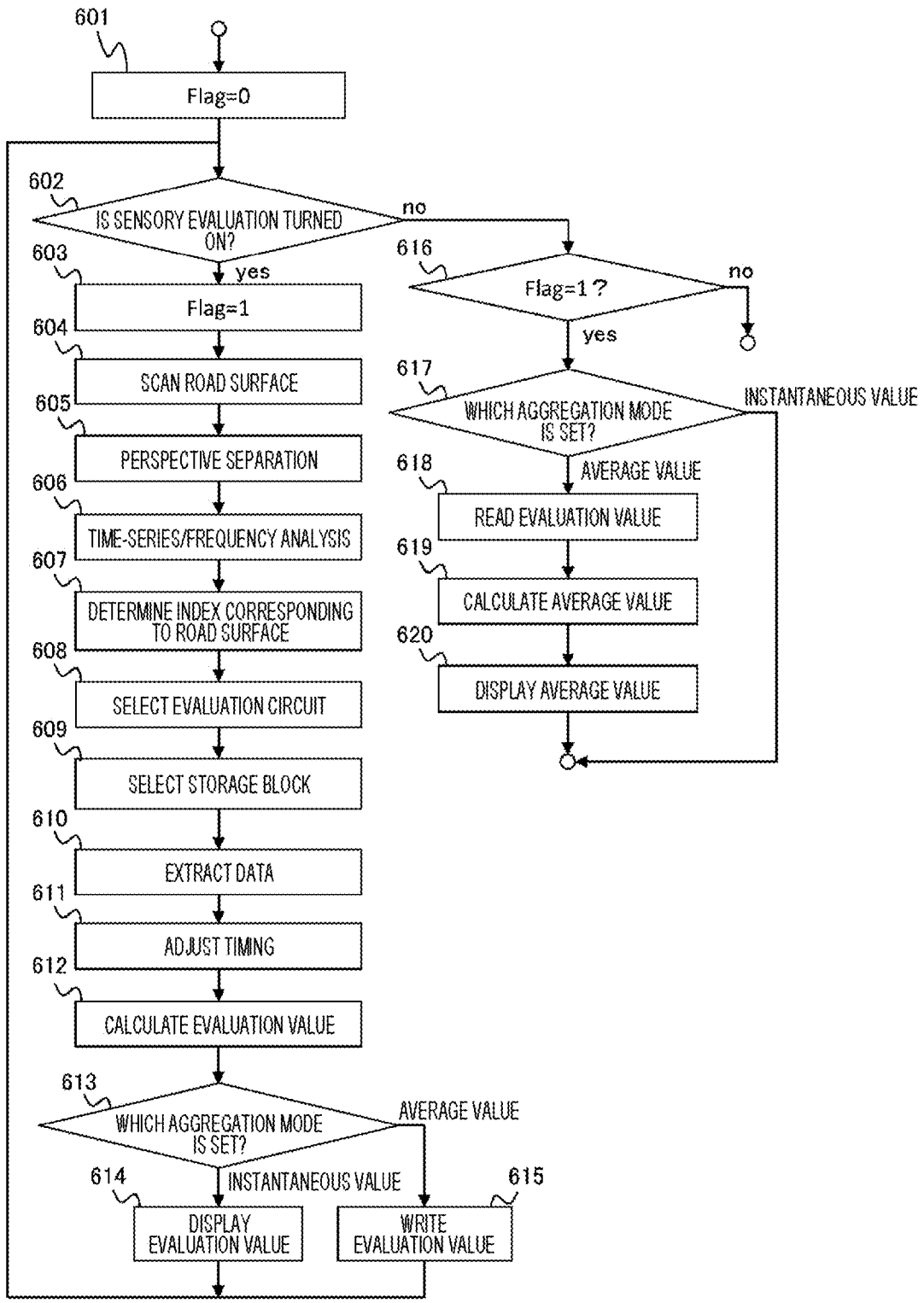
FIG. 6 is a flowchart illustrating a processing flow of the sensory evaluation system according to the first embodiment of the present invention.

FIG. 6 is a flowchart illustrating a processing flow of the sensory evaluation system according to the first embodiment of the present invention.

First, in Step 601, the control unit 103 sets "0" indicating that sensory evaluation has not been executed to a flag value indicating an execution status of the sensory evaluation.

In Step 602, the control unit 103 determines whether the sensory evaluation ON has been set by an operation or the like from the occupant of the host vehicle, that is, whether an execution instruction for the sensory evaluation has been issued. In the case of the sensory evaluation ON, it is determined that the execution instruction for the sensory evaluation has been issued, and the processing proceeds to Step 603. In the case of the sensory evaluation OFF, it is determined that the execution instruction for the sensory evaluation has not been issued, and the processing proceeds to Step 616.

In Step 603, the control unit 103 sets "1" indicating that the execution has started to the above-described flag value indicating the execution status of the sensory evaluation.

In Step 604, the control unit 103 starts scanning a road surface on the front side of the host vehicle and acquires road surface information using the second sensor 116 which is the camera in the sensor group 105.

In Step 605, the control unit 103 performs perspective separation of the road surface information acquired by the second sensor 116. As a result, the road surface information output from the second sensor 116 is separated into road surface information on the far side of the host vehicle used in the evaluation index determination unit 106 and road surface information on the near side of the host vehicle used in the data adjustment unit 119.

In Step 606, the evaluation index determination unit 106 executes time-series analysis and frequency analysis using the road surface information of the far side between pieces of the road surface information obtained by the perspective separation in Step 605, and extracts a feature of the road surface.

In Step 607, the evaluation index determination unit 106 determines a sensory index corresponding to the road surface on which the host vehicle travels based on an analysis result of Step 606. Here, at least one of a plurality of types of sensory indexes set in advance, for example, the five types of sensory indexes including the flat feeling, the harshness, the stroke feeling, the fluffy feeling, and the plushness described above is determined from the feature of the road surface extracted in Step 606 as the sensory index corresponding to the road surface. As a result, at least any one sensory index among the plurality of sensory indexes is selected as an evaluation index to be used for sensory evaluation.

In Step 608, the control unit 103 selects an evaluation circuit corresponding to the sensory index selected as the evaluation index in Step 607 from among the evaluation circuits 120 to 124 provided for the respective sensory indexes.

In Step 609, the control unit 103 selects a storage area of the aggregation data storage unit 110 corresponding to the evaluation circuit selected in Step 608 as a storage block of an evaluation value.

In Step 610, the data adjustment unit 119 extracts acceleration information and angular velocity information acquired by the first sensor 115 and the fourth sensor 118 in the sensor group 105 over a predetermined time range, and generates time-series data to be used as evaluation data. Note that not the time-series data itself but data based on the time-series data, for example, spectrum data representing a frequency component of the time-series data, data obtained by processing the time-series data or the spectrum data may be created as the evaluation data. The evaluation data can be created in any data format as long as evaluation data can be used to calculate an evaluation value in the evaluation circuits 120 to 124.

In Step 611, the data adjustment unit 119 adjusts an operation start timing of the evaluation circuit using the road surface information of the near side between pieces of the road surface information obtained by the perspective separation in Step 605, vehicle speed information acquired by the third sensor 117, and the like. Then, according to the adjusted timing, the time-series data generated in Step 610 is developed as evaluation data in the evaluation circuit selected in Step 608.

In Step 612, the evaluation circuit selected in Step 608 from among the evaluation circuits 120 to 124 calculates an evaluation value for the evaluation index selected in Step 607 based on the evaluation data input from the data adjustment unit 119 in Step 611.

In Step 613, the aggregation unit 108 determines whether a set aggregation mode is an instantaneous value aggregation mode or an average value aggregation mode based on a value of the aggregation mode selection register 114. For example, when the value of the aggregation mode selection register 114 is "0", it is determined that the instantaneous value aggregation mode is set, and the processing proceeds to Step 614. When the value of the aggregation mode selection register 114 is "1", it is determined that the average value aggregation mode is set, and the processing proceeds to Step 615.

In Step 614, the aggregation unit 108 transfers the evaluation value calculated in Step 612 to the in-vehicle display unit 111 for display. As a result, an instantaneous value of the evaluation value for the evaluation index selected in Step 607 is output to the outside using the in-vehicle display unit 111. Note that there is a case where the instantaneous value changes too quickly to be hardly visible depending on a calculation cycle of the evaluation value. In such a case, a predetermined time average value may be calculated and displayed instead of the instantaneous value.

In Step 615, the aggregation unit 108 writes the evaluation value calculated in Step 612 into the storage block selected in Step 609. When the process in Step 614 or Step 615 is completed, the processing returns to Step 602, and the above-described processing is repeated. As a result, the series of processes in Step 603 to 615 is continuously executed until it is determined in Step 602 that the sensory evaluation OFF has been set.

When it is determined in Step 602 that the sensory evaluation OFF has been set, the control unit 103 determines whether the above-described flag value indicating the execution status of the sensory evaluation is set to "1" in Step 616. When the flag value is set to "1", it is determined that the sensory evaluation has been executed by the series of processes in Step 603 to 615, and the processing proceeds to Step 617. When the flag value is set to "0", it is determined that the sensory evaluation has not been executed, and the processing returns to Step 601.

In Step 617, the aggregation unit 108 determines whether a set aggregation mode is the instantaneous value aggregation mode or the average value aggregation mode, similarly to Step 613 described above. When the average aggregation mode is set, the processing proceeds to Step 618. When the instantaneous value aggregation mode is set, the processing returns to Step 601.

In Step 618, the aggregation unit 108 reads evaluation values stored in the aggregation data storage unit 110.

In Step S619, the aggregation unit 108 calculates an average value of the evaluation values for each evaluation index from the start of the processing of FIG. 6 based on the evaluation values read in Step 615. Next, in Step 620, the aggregation unit 108 transfers the average value calculated in Step 619 to the in-vehicle display unit 111 for display. As a result, the average value of the evaluation values when the host vehicle has traveled on the road surface to be evaluated is aggregated and output to the outside using the in-vehicle display unit 111. When the process in Step 620 is completed, the processing returns to Step 601.

FIG. 7 is a view illustrating an example of a relationship between a traveling road surface and an output waveform of an evaluation circuit in the first embodiment of the present invention. FIG. 7 illustrates output waveforms of the evaluation circuits 120 and 121 when the traveling road surface of the host vehicle changes as indicated by a road surface type 701. As illustrated in FIG. 7, the evaluation circuit 120 corresponding to the flat feeling outputs evaluation values whose instantaneous values change as indicated by output waveforms 702, 703, and 704, for example, on the respective traveling road surfaces of "good road 1", "degraded asphalt road", and "good road 2". On the other hand, the evaluation circuit 121 corresponding to the harshness outputs evaluation values whose instantaneous values change as indicated by output waveforms 705, 706, and 707, for example, on the respective traveling road surfaces of "good road 1", "degraded asphalt road", and "good road 2".

Here, a road surface to be evaluated for the flat feeling is the good road, and the degraded asphalt road is not evaluated for the flat feeling. On the other hand, a road surface to be evaluated for the harshness is the degraded asphalt road, and the good road is not evaluated. In this case, as illustrated in FIG. 7, the output waveform 703 is excluded from evaluation value aggregation targets for the evaluation circuit 120, and the output waveforms 705 and 707 are excluded from evaluation value aggregation targets for the evaluation circuit 121. That is, it is expected that the respective evaluation circuits including the evaluation circuits 120 and 121 deal with sensory functions such as ride comfort and do not output a fixed value. In addition, it is considered that each evaluation circuit has already completed assumed learning and outputs an evaluation value in an appropriate range in the case of the road surface to be evaluated. Therefore, it is expected that outputs such as the output waveforms 702, 704, and 706 can be obtained. On the other hand, in the case of the road surface not to be evaluated, each evaluation circuit has not completed the assumed learning, and thus, it is expected that the output fluctuates with a large fluctuation width as in the output waveform 703, or the output is saturated to an upper limit value as in the output waveforms 705 and 707. In other words, it is considered that an evaluation value obtained from each evaluation circuit when the vehicle travels on the road surface not to be evaluated has low reliability. Therefore, the evaluation index determination unit 106 selects the sensory index corresponding to the road surface state as the evaluation index using the road surface information transferred from the second sensor 116 in the present embodiment as described above. As a result, the evaluation value on the road surface not to be evaluated is excluded.

FIGS. 8(a) and 8(b) are views illustrating an example of a sensory evaluation result displayed on the in-vehicle display unit 111. FIG. 8(a) is an example in which evaluation values for the above-described five types of sensory indexes, that is, the flat feeling, the harshness, the stroke feeling, the fluffy feeling, and the plushness are visualized by a radar chart. Note that the sensory indexes to be visualized are not limited to those illustrated in FIG. 8(a), and can be selected based on a setting value of the display selection register 113. The display selection register 113 can be configured as, for example, an aggregate of 1-bit registers corresponding to the respective sensory indexes. That is, a register value of "1" or "0" is set in the display selection register 113 for each of the flat feeling, the harshness, the stroke feeling, the fluffy feeling, and the plushness. Then, an aggregation result of evaluation values is displayed as in FIG. 8(a) for the sensory index whose register value is set to "1", and display is not performed for the sensory index whose register value is set to "0". That is, FIG. 8(a) illustrates an example in a case where all register values of the display selection registers 113 corresponding to the above-described five types of sensory indexes are set to "1".

In addition, aggregation results of evaluation values obtained by different aggregation methods are displayed as sensory evaluation results based on setting values of the aggregation mode selection register 114 in the in-vehicle display unit 111 as described above. For example, the average value aggregation mode is set when the register value of the aggregation mode selection register 114 is "1", and the average value of evaluation values when the host vehicle travels on the road surface to be evaluated is displayed as the sensory test result. On the other hand, the instantaneous value aggregation mode is set when the register value of the aggregation mode selection register 114 is "0", and the instantaneous value of the evaluation value when the host vehicle travels on the road surface to be evaluated is displayed as the sensory test result. Note that the above description is given as an example, and the register value that can be taken by the aggregation mode selection register 114 may be enlarged to use a moving average value. Furthermore, a register having a width of 2 bits or more may be set in the aggregation mode selection register 114 in order to make it possible to select a window width at the time of calculating the moving average from a plurality of values.

FIG. 8(*b*) is an example in which an evaluation value for the harshness among the above-described five types of sensory indexes is visualized by a bar graph. That is, FIG. 8(*b*) illustrates an example in a case where the register value of the display selection register 113 only for the harshness is and the register value for the other sensory indexes is "0". Note that a setting specification of the aggregation mode selection register 114 is similar to that in the case of FIG. 8(*a*) described above, and thus, the description thereof is omitted.

Note that the examples of FIGS. 8(*a*) and 8(*b*) are illustrated with 7.0 points as a reference evaluation point. Although such display of the reference evaluation point is not an essential display specification, the obtained sensory evaluation result can be easily visualized since the comparison with the reference evaluation point is easy.

Figure 9:
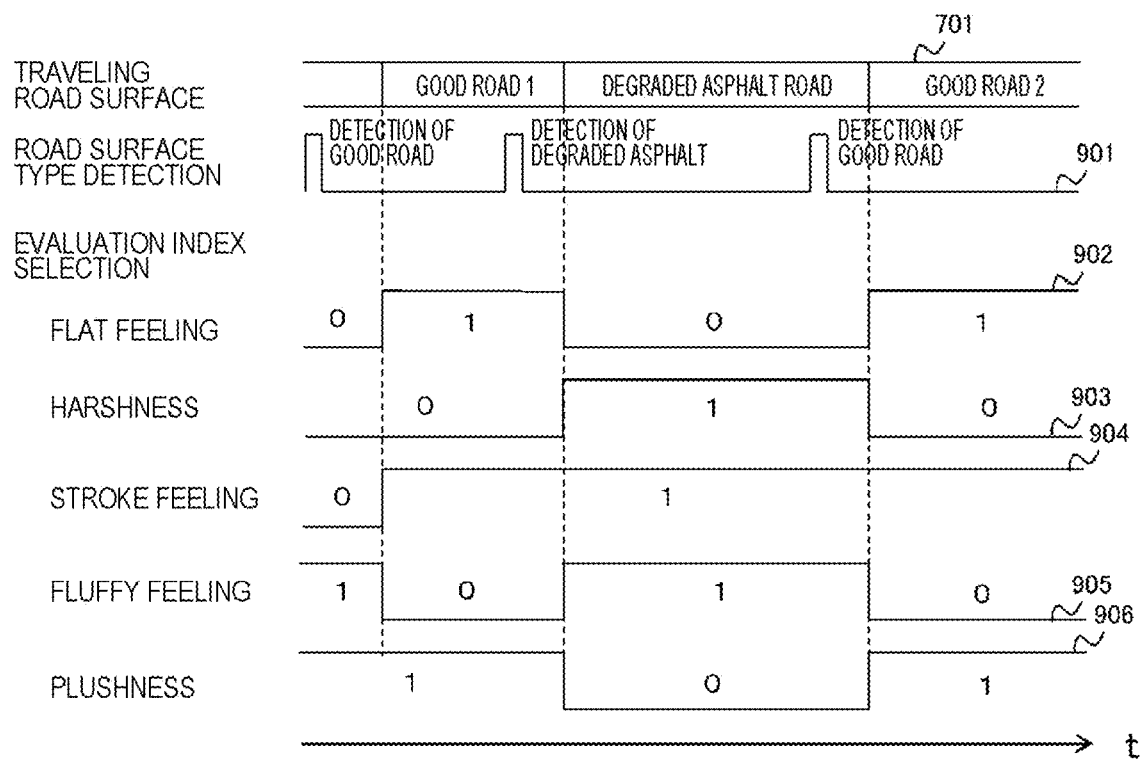
FIG. 9 is a timing chart illustrating an example of a relationship between a traveling road surface and a selection result of an evaluation index in the first embodiment of the present invention.

FIG. 9 is a timing chart illustrating an example of a relationship between a traveling road surface and a selection result of an evaluation index in the first embodiment of the present invention. In FIG. 9, regarding a case where the traveling road surface of the host vehicle changes similarly to FIG. 7, a detection result of a road surface type is indicated by a timing waveform 901, and selection results of evaluation indexes for the respective sensory indexes of the flat feeling, the harshness, the stroke feeling, the fluffy feeling, and the plushness are indicated by timing waveforms 902 to 906, respectively.

When the traveling road surface of the host vehicle changes as indicated by the road surface type 701, the evaluation index determination unit 106 acquires a detection result of the road surface type as indicated by the timing waveform 901, for example, based on the road surface information transferred from the second sensor 116. That is, if the road surface type changes, the evaluation index determination unit 106 detects the changed road surface type at the timing when a pulse waveform becomes High (1) in the timing waveform 901. When the changed road surface type is detected in this manner, the evaluation index determination unit 106 selects at least any one of the five types of sensory indexes as an evaluation index as indicated by the timing waveforms 902 to 906 for the detected road surface type. That is, on the good road, for example, each sensory index of the flat feeling, the stroke feeling, and the plushness is selected as the evaluation index, and each of the timing waveforms 902, 904, and 906 corresponding to these evaluation indexes is output as High (1) during traveling on the road surface to be evaluated. On the other hand, for the harshness and the fluffy feeling that are not selected as the evaluation indexes, the timing waveforms 903 and 905 corresponding to these evaluation indexes are output as Low (0). In addition, on the degraded asphalt road, for example, each sensory index of the harshness, the stroke feeling, and the fluffy feeling is selected as the evaluation index, and each of the timing waveforms 903, 904, and 905 corresponding to these evaluation indexes is output as High (1) during traveling on the road surface to be evaluated. On the other hand, for the flat feeling and the plushness that are not selected as the evaluation indexes, the timing waveforms 902 and 906 corresponding to these evaluation indexes are output as Low (0). A switching timing for the timing waveform 902 to 906 at this time is determined according to a detection timing of the road surface type or the vehicle speed of the host vehicle.

Note that FIG. 9 assumes the case where the road surface type is switched according to the traveling of the host vehicle as in the road surface type 701, and illustrates the example in which the evaluation index is selected at the timing such as the timing waveforms 902 to 906, but these are examples. There are various methods for selecting an evaluation index from among a plurality of sensory indexes, and it is possible to select the evaluation index at any timing according to a selection method.

Next, a specific example of the evaluation index determination unit 106 will be described. The evaluation index determination unit 106 can select an evaluation index based on the road surface information acquired by the second sensor 116, the radar that scans the front side of the host vehicle, or the like by pattern matching as described above. For example, it is possible to perform the pattern matching by focusing on a time-series waveform of sensor data acquired as the road surface information or a shape of a power spectral density (PSD), and select an evaluation index according to a road surface state. Alternatively, the evaluation index determination unit 106 may be realized using a hierarchical neural network similar to the evaluation circuit 401 described above.

Figures 10A, 10B:
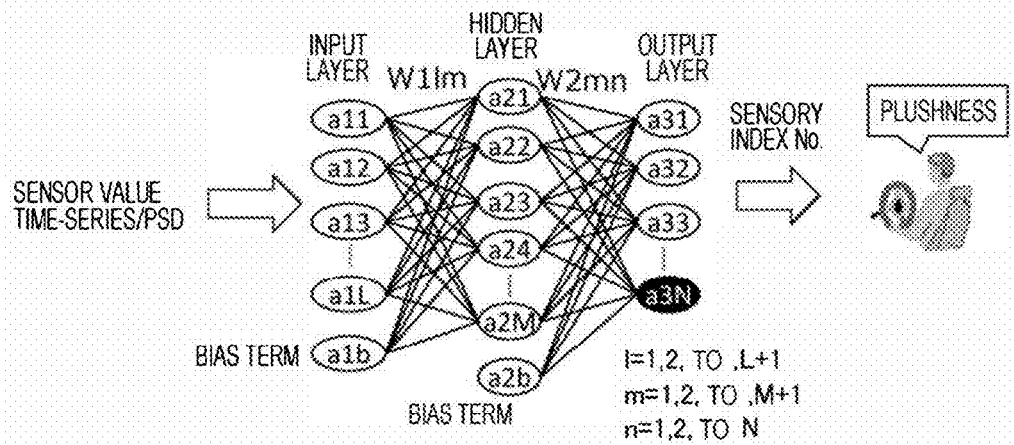
FIGS. 10(a) and 10(b) are views illustrating a circuit example of the evaluation index determination unit according to the first embodiment of the present invention.

FIGS. 10(*a*) and 10(*b*) are views illustrating a circuit example of the evaluation index determination unit 106 according to the first embodiment of the present invention. FIG. 10(*a*) is a view illustrating a circuit example of the evaluation index determination unit 106 using a hierarchical neural network having a time-series waveform of a sensor value representing road surface information or a power spectral density as an input and a number of a sensory index selected as an evaluation index as an output, and FIG. 10(*b*) is a table illustrating a relationship between the output of the evaluation index determination unit 106 and a sensory index.

The circuit illustrated in FIG. 10(*a*) includes the hierarchical neural network having a three-layer configuration in which elements of an input layer (the number of elements $L+1$), a hidden layer (the number of elements $M+1$), and an output layer (the number of elements N) are hierarchically coupled. Note that one element representing a bias term is set for each of the input layer and the hidden layer as illustrated in FIG. 10(*a*). Each element of the input layer and each element of the hidden layer are coupled with a weight $W1lm$ ($l=1$ to $L+1$, $m=1$ to $M+1$), and each element of the hidden layer and each element of the output layer are coupled with a weight $W2mn$ ($m=1$ to $M+1$, $n=1$ to N). These pieces of weight information are stored in the weight parameter storage unit 109.

In the pattern matching described above, it is necessary to quantitatively determine the relationship between the time-series waveform of the sensor value representing the road surface information or the shape of the power spectral density, and the sensory index to be selected as the evaluation index in advance. However, when the hierarchical neural network as illustrated in FIG. 10(*a*) is applied, teacher data can be acquired from an evaluator such as an expert driver during a sensory evaluation test, and thus, it is possible to select an evaluation index conforming to an actual way of thinking of the evaluator. FIG. 10(*a*) illustrates a case where the evaluator replies "plushness" as the evaluation index with respect to the time-series data of the sensor value or PSD data obtained during the sensory evaluation test. In this case, learning of the neural network may be performed by creating teacher data such that only the Nth output layer element is "1" according to the correspondence table illustrated in FIG. 10(*b*) and performing back propagation or the like.

According to the first embodiment of the present invention described above, the following operational effects are achieved.

(1) The sensory evaluation system 101 performs sensory evaluation on a plurality of sensory indexes corresponding to respective feelings of an occupant according to traveling of a host vehicle that is a moving body. The sensory evaluation system 101 includes: the data adjustment unit 119 that generates evaluation data used for the sensory evaluation based on information acquired according to the traveling of the host vehicle; the evaluation index determination unit 106 that selects at least one sensory index from among the plurality of sensory indexes as an evaluation index based on the information; the evaluation unit 107 that calculates evaluation values for the evaluation indexes from evaluation data using the evaluation circuits 120 to 124 corresponding to the evaluation indexes; and the aggregation unit 108 that aggregates the evaluation values calculated by the evaluation unit 107. In this manner, it is possible to provide the sensory evaluation technique capable of obtaining the evaluation result contributing to the improvement of the ride comfort.

(2) The information includes road surface information on a road surface on which the host vehicle travels. The evaluation index determination unit 106 selects an evaluation index based on the road surface information. Specifically, the evaluation index determination unit 106 selects the evaluation index based on a preset relationship between the road surface information and the evaluation index or a relationship between the road surface information and the evaluation index acquired by learning. In this manner, the evaluation index can be appropriately selected from among the plurality of sensory indexes.

(3) The information includes at least one of acceleration information on an acceleration of the host vehicle and angular velocity information on an angular velocity of the host vehicle. The data adjustment unit 119 generates evaluation data based on at least one of the acceleration information and the angular velocity information. Specifically, the time-series data 402 of at least one of the acceleration information and the angular velocity information or data based on the time-series data 402 is generated as the evaluation data. In this manner, it is possible to generate the evaluation data suitable for calculation of the evaluation value.

(4) The data adjustment unit 119 can generate the evaluation data by making at least one of a time range and a time interval of the time-series data 402 different for each evaluation circuit. In this manner, it is possible to generate the optimum evaluation data for each evaluation circuit.

(5) The evaluation unit 107 includes the plurality of evaluation circuits 120 to 124 corresponding to the plurality of respective sensory indexes, and selects an evaluation circuit corresponding to an evaluation index from among the evaluation circuits 120 to 124 (Step 608), and calculates an evaluation value using the selected evaluation circuit (Step 612). In this manner, the calculation of the evaluation value for each sensory index can be easily realized.

(6) The aggregation unit 108 can set either a first aggregation mode (instantaneous value aggregation mode) or a second aggregation mode (average value aggregation mode). When the first aggregation mode is set, the aggregation unit 108 outputs an instantaneous value or a time average value of the evaluation value for the evaluation index (Step 614). When the second aggregation mode is set, the aggregation unit 108 aggregates and outputs an average value of evaluation values for each evaluation index during traveling of the host vehicle in a predetermined road section (Steps 619 and 620). In this manner, the sensory evaluation result can be output in an appropriate format according to the purpose.

Second Embodiment

A second embodiment of the present invention will be described hereinafter with reference to FIGS. 11 and 12. In the present embodiment, an example of determining an evaluation index from among a plurality of sensory indexes with reference to map information will be described.

Figure 11:
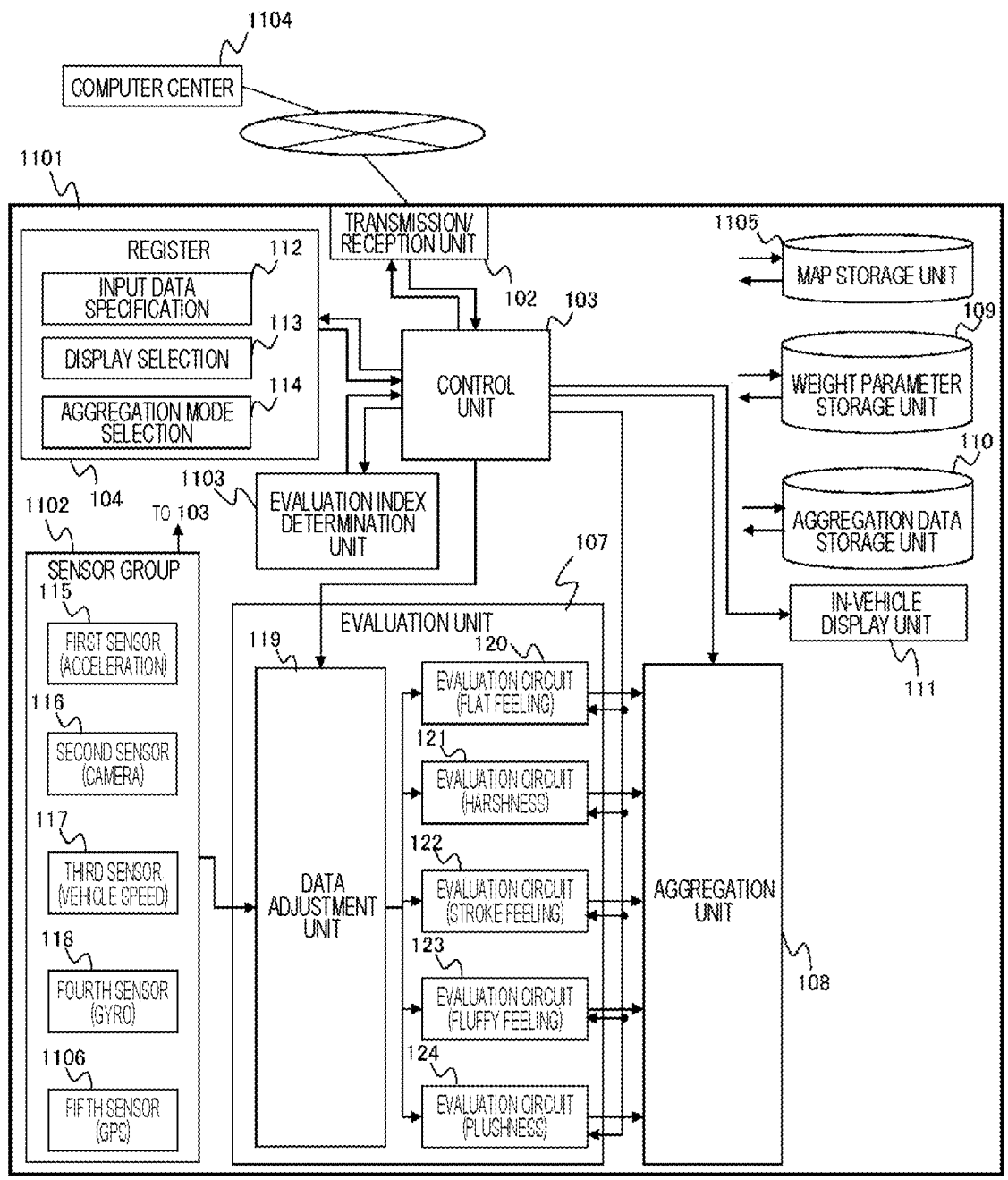
FIG. 11 is a block diagram illustrating a functional configuration of a sensory evaluation system according to a second embodiment of the present invention.

FIG. 11 is a block diagram illustrating a functional configuration of a sensory evaluation system according to the second embodiment of the present invention. A sensory evaluation system 1101 illustrated in FIG. 11 is different from the sensory evaluation system 101 of FIG. 1 described in the first embodiment in that the sensor group 105 and the evaluation index determination unit 106 are replaced with a sensor group 1102 and an evaluation index determination unit 1103, respectively, and in terms of being connected to a computer center 1104 instead of the computer center 150, and including a map storage unit 1105.

The sensor group 1102 further includes a fifth sensor 1106 in addition to the first sensor 115, the second sensor 116, the third sensor 117, and the fourth sensor 118 described in the first embodiment. The fifth sensor 1106 is a GPS sensor that receives a GPS signal. The sensory evaluation system 1101 of the present embodiment can identify a position of a host vehicle using the GPS signal received by the fifth sensor 1106.

The evaluation index determination unit 1103 selects any of a plurality of sensory indexes as an evaluation index similarly to the evaluation index determination unit 106 described in the first embodiment. At this time, the evaluation index determination unit 106 of the first embodiment selects the evaluation index based on the road surface information acquired by the second sensor 116, but the evaluation index determination unit 1103 of the present embodiment selects the evaluation index based on road surface information transferred from the map storage unit 1105.

The computer center 1104 manages map data including road information in addition to management of learning data used in the evaluation index determination unit 1103 and the evaluation unit 107 similarly to the computer center 150 described in the first embodiment. The road information includes not only latitude and longitude but also all pieces or at least one piece of road surface information such as a type of a road surface, a road surface characteristic, and a surface shape of the road surface, and information such as a gradient and a curvature. Furthermore, the road information may include information of an evaluation index corresponding to each road. If the road information includes the information of the evaluation index, the selection of the evaluation circuits 120 to 124 by the evaluation index determination unit 1103 and the processing of the aggregation unit 108 can be determined with reference to the information.

The map storage unit 1105 is a block that stores the map data to which the road information is assigned. The map data stored in the map storage unit 1105 is obtained by downloading a part of the map data managed by the computer center 1104 via the transmission/reception unit 102.

The map data is downloaded from the computer center 1104 as follows, for example. First, the sensory evaluation system 1101 measures a position of the host vehicle using the fifth sensor 1106, and transmits coordinate data of latitude and longitude indicating the position to the computer center 1104 via the transmission/reception unit 102. Based on the coordinate data received from the sensory evaluation system 1101, the computer center 1104 transmits map data of a certain range, for example, map data within a radius of 10 km excluding the rear side from the host vehicle, to the sensory evaluation system 1101. The sensory evaluation system 1101 downloads the map data transmitted from the computer center 1104 and stores the map data in the map storage unit 1105.

When the download of the map data is completed, the sensory evaluation system 1101 accesses the map storage unit 1105 every time the position of the host vehicle changes due to traveling, and acquires road surface information of a road corresponding to the position of the host vehicle measured using the fifth sensor 1106. Then, the evaluation index determination unit 1103 determines an evaluation index based on the acquired road surface information. In this manner, the selection of the evaluation index based on the map information is realized.

Figure 12:
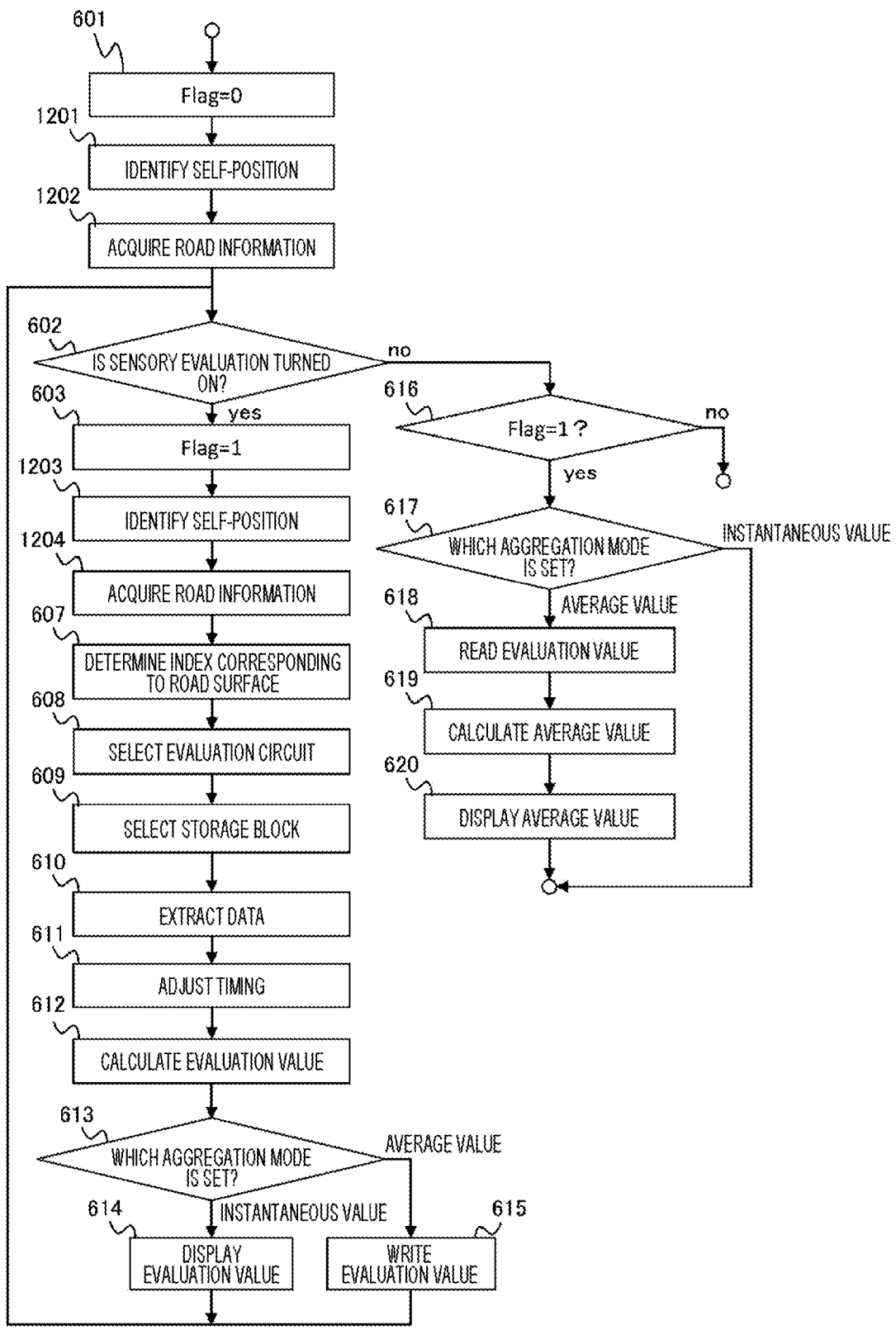
FIG. 12 is a flowchart illustrating a processing flow of the sensory evaluation system according to the second embodiment of the present invention.

FIG. 12 is a flowchart illustrating a processing flow of the sensory evaluation system according to the second embodiment of the present invention. The flowchart of FIG. 12 is different from the flowchart of FIG. 1 described in the first embodiment in that Steps 1201 and 1202 are added between Steps 601 and 602, and Steps 1203 and 1204 are provided instead of Step 604 to 606. Note that a description other than these processing steps different from those in the first embodiment will be omitted hereinafter unless otherwise necessary.

In Step 1201, the control unit 103 identifies a position of the host vehicle using the fifth sensor 1106, which is the GPS sensor in the sensor group 1102 before the host vehicle starts traveling. Next, in Step 1202, the control unit 103 makes an inquiry to the computer center 1104 via the transmission/reception unit 102, downloads map data within a certain range from the host vehicle, and transfers the map data to the map storage unit 1105. As a result, the sensory evaluation system 1101 can acquire road surface information of a road on which the host vehicle is to travel in advance. That is, sensory evaluation can be performed using the road surface information of the map data stored in advance in the map storage unit 1105 without inquiring the computer center 1104 every time the position changes according to traveling of the host vehicle.

In Step 1203, the control unit 103 identifies a position of the host vehicle using the fifth sensor 1106 during traveling of the host vehicle. Next, in Step 1204, the control unit 103 acquires road surface information of a road corresponding to the position of the host vehicle identified in Step 1203, for example, road surface information of a road 10 m ahead from the map storage unit 1105. Then, the acquired road surface information is transferred to the evaluation index determination unit 1103.

In Step 607, the evaluation index determination unit 1103 determines a sensory index corresponding to the road surface on which the host vehicle travels based on the road surface information transferred in Step 1204. Here, at least one of a plurality of types of preset sensory indexes is determined as a sensory index corresponding to the road surface from the road surface information transferred in Step 1204, which is different from Step 607 in FIG. 6 described in the first embodiment. As a result, at least any one sensory index among the plurality of sensory indexes is selected as an evaluation index to be used for sensory evaluation.

According to the second embodiment of the present invention described above, the same operational effects as those of the first embodiment are achieved. Furthermore, it is unnecessary to operate the evaluation index determination unit 1103 at all times during traveling of the host vehicle, and thus, the configuration of the sensory evaluation system 1101 can be simplified, and power consumption can be reduced.

Third Embodiment

A third embodiment of the present invention will be described hereinafter with reference to FIGS. 13 to 15. In the present embodiment, an example in which one evaluation circuit is commonly used for a plurality of sensory indexes will be described.

Figure 13:
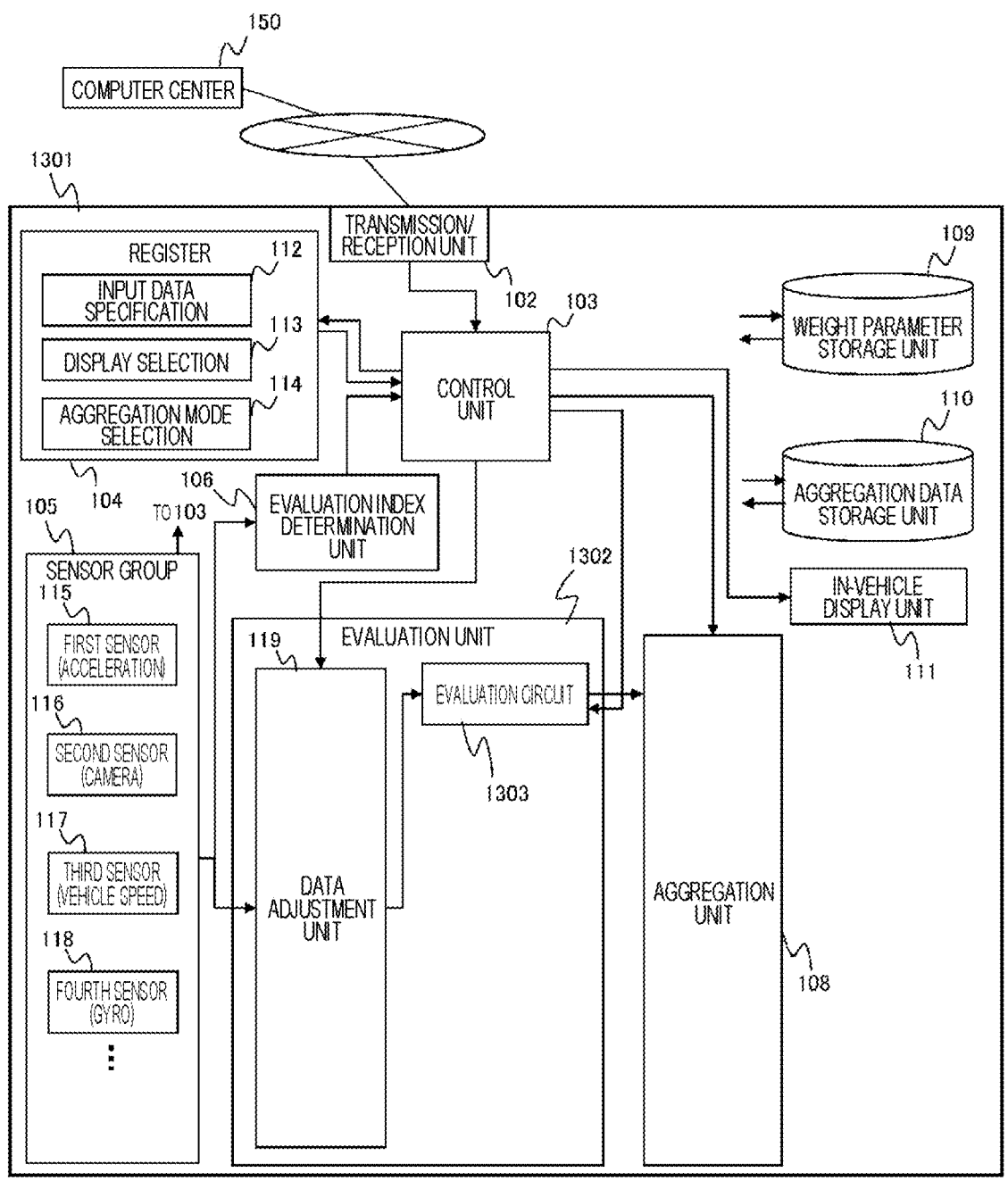
FIG. 13 is a block diagram illustrating a functional configuration of a sensory evaluation system according to a third embodiment of the present invention.

FIG. 13 is a block diagram illustrating a functional configuration of a sensory evaluation system according to the third embodiment of the present invention. A sensory evaluation system 1301 illustrated in FIG. 13 is different from the sensory evaluation system 101 of FIG. 1 described in the first embodiment in that only one evaluation circuit 1303 is provided in an evaluation unit 1302.

The evaluation circuit 1303 is obtained by sharing the evaluation circuits 120 to 124 for the respective sensory indexes described in FIG. 1 in the first embodiment with respect to the plurality of sensory indexes. That is, the evaluation circuit 1303 is commonly used for each of the above-described sensory indexes, for example, the five types of sensory indexes such as the flat feeling, the harshness, the stroke feeling, the fluffy feeling, and the plushness. Note that a plurality of the evaluation circuits 1303 may be present in the evaluation unit 1302 although only one evaluation circuit 1303 is illustrated in the example of FIG. 13. As long as one evaluation circuit 1303 is commonly used for at least two types of sensory indexes, any number of evaluation circuits 1303 can be provided in the evaluation unit 1302.

Figure 14A:
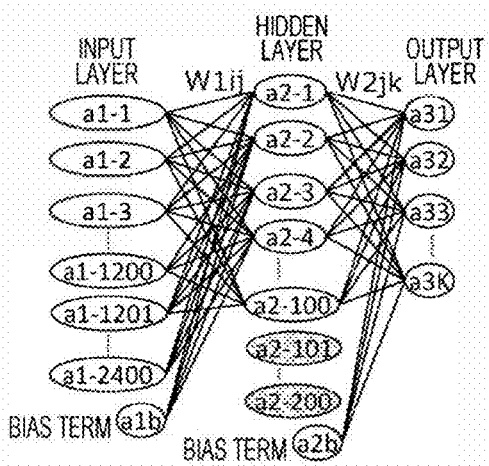
FIGS. 14(a)-14(c) are views illustrating an evaluation circuit according to the third embodiment of the present invention.
Figure 14B:
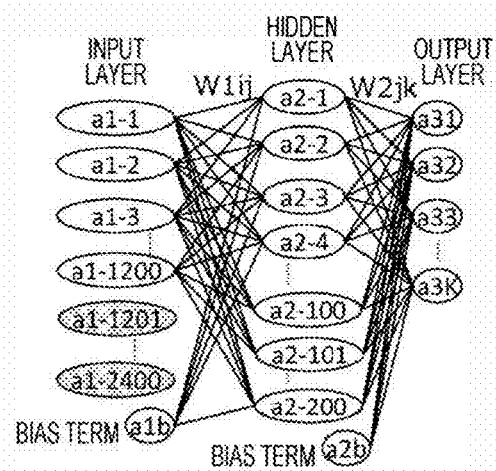
Figure 14C:
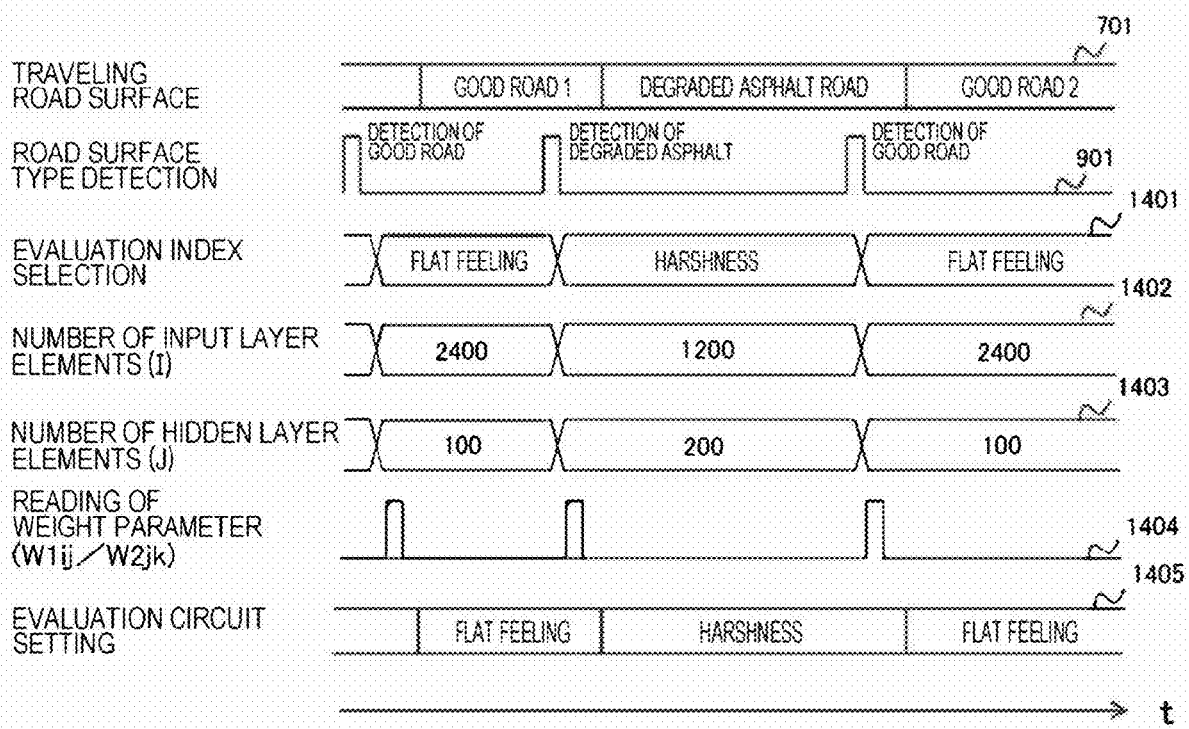

FIGS. 14(*a*)-14(*c*) are views illustrating an evaluation circuit according to the third embodiment of the present invention. FIGS. 14(*a*) and 14(*b*) illustrate examples of the evaluation circuit 1303 configured using a hierarchical neural network and adjusted so as to correspond to different sensory indexes. These views illustrate examples of the evaluation circuit 1303 capable of calculating a prediction value for each of two types of sensory indexes by adjusting elements and connections to be enabled without changing the number of elements of each of an input layer, a hidden layer, and an output layer.

In all the circuit configurations of FIGS. 14(*a*) and 14(*b*), the number of input layer elements is 2400+1 (bias term), and the number of hidden layer elements is 200+1 (bias term). In the configuration of the evaluation circuit 1303 illustrated in FIG. 14(*a*), all 2400 elements are used in the input layer, and only 100 elements are used in the hidden layer, except for the bias terms. On the other hand, in the configuration of the evaluation circuit 1303 illustrated in FIG. 14(*b*), only 1200 elements are used in the input layer, and all 200 elements are used in the hidden layer, except for the bias terms. Note that setting of an element to be set as non-use can be realized by setting of a weight parameter. Specifically, among weight parameters W1ij and W2jk coupling elements between different layers, weight parameters of connections coupled to non-use elements displayed by hatching in FIGS. 14(*a*) and 14(*b*), that is, elements a2-101 to a2-200 of the hidden layer in FIG. 14(*a*) and elements a1-1201 to a1-2400 of the input layer in FIG. 14(*b*) may set to "0" for handling as if the respective connections do not exist. Furthermore, as weight parameters W1ij and W2jk related to elements to be used excluding the above non-use elements are switched according to a sensory index, calculation of an evaluation value for a desired sensory index can be realized by the single evaluation circuit 1303.

FIG. 14(*c*) is a timing chart illustrating an example of a relationship among a traveling road surface, a selection result of an evaluation index, and a setting result of an evaluation circuit. In FIG. 14(*c*), regarding a case where the traveling road surface of the host vehicle changes similarly to FIGS. 7 and 9, a detection result of a road surface type is indicated by a timing waveform 901, and selection results of evaluation indexes for the respective sensory indexes of the flat feeling, the harshness, the stroke feeling, the fluffy feeling, and the plushness are indicated by a timing waveform 1401. In addition, the number of elements of an input layer and the number of elements of a hidden layer used to calculate an evaluation position in the evaluation circuit 1303 are indicated by timing waveforms 1402 and 1403, respectively, and a read timing of a weight parameter used to set the evaluation circuit 1303 is indicated by a timing waveform 1404. Furthermore, a setting state of the evaluation circuit 1303 is indicated by an evaluation circuit setting 1405.

When the traveling road surface of the host vehicle changes as indicated by the road surface type 701, the evaluation index determination unit 106 acquires a detection result of the road surface type as indicated by the timing waveform 901, for example, in the same manner as described in FIG. 9 in the first embodiment. When the changed road surface type is detected in this manner, the evaluation index determination unit 106 selects any of the five types of sensory indexes as an evaluation index for the detected road surface type as indicated by the timing waveform 1401. That is, for example, the flat feeling is selected as the evaluation index on the good road. For example, on the degraded asphalt road, the harshness is selected as the evaluation index. Then, the number of elements of the input layer and the number of elements of the hidden layer are set according to the selected evaluation index as indicated by the timing waveforms 1402 and 1403, respectively. Note that FIG. 14(*c*) illustrates an example of a case where the number of input layer elements and the number of hidden layer elements are determined to be 2400 and 100 in advance as circuit specifications of the evaluation circuit 1303 corresponding to the flat feeling, and the number of input layer elements and the number of hidden layer elements are determined to be 1200 and 200 in advance as circuit specifications of the evaluation circuit 1303 corresponding to the harshness. These circuit specifications are determined according to weight parameters read from the weight parameter storage unit 109 at timings indicated by the timing waveform 1404. As a result, the setting state of the evaluation circuit 1303 is switched according to the type of the traveling road surface as illustrated in the evaluation circuit setting 1405.

Note that the specific examples of the number of elements of each of the input layer and the number of elements of the hidden layer have been described above, but the number of elements constituting the evaluation circuit 1303 of the present embodiment is not limited to these examples. If the maximum number of elements among the number of elements used in each sensory index is prepared in the evaluation circuit 1303, a sensory index for which an evaluation value is to be calculated can be switched in the evaluation circuit 1303 by adjusting weight parameters within the range to switch between enabling and disabling of the respective elements and connections.

Figure 15:
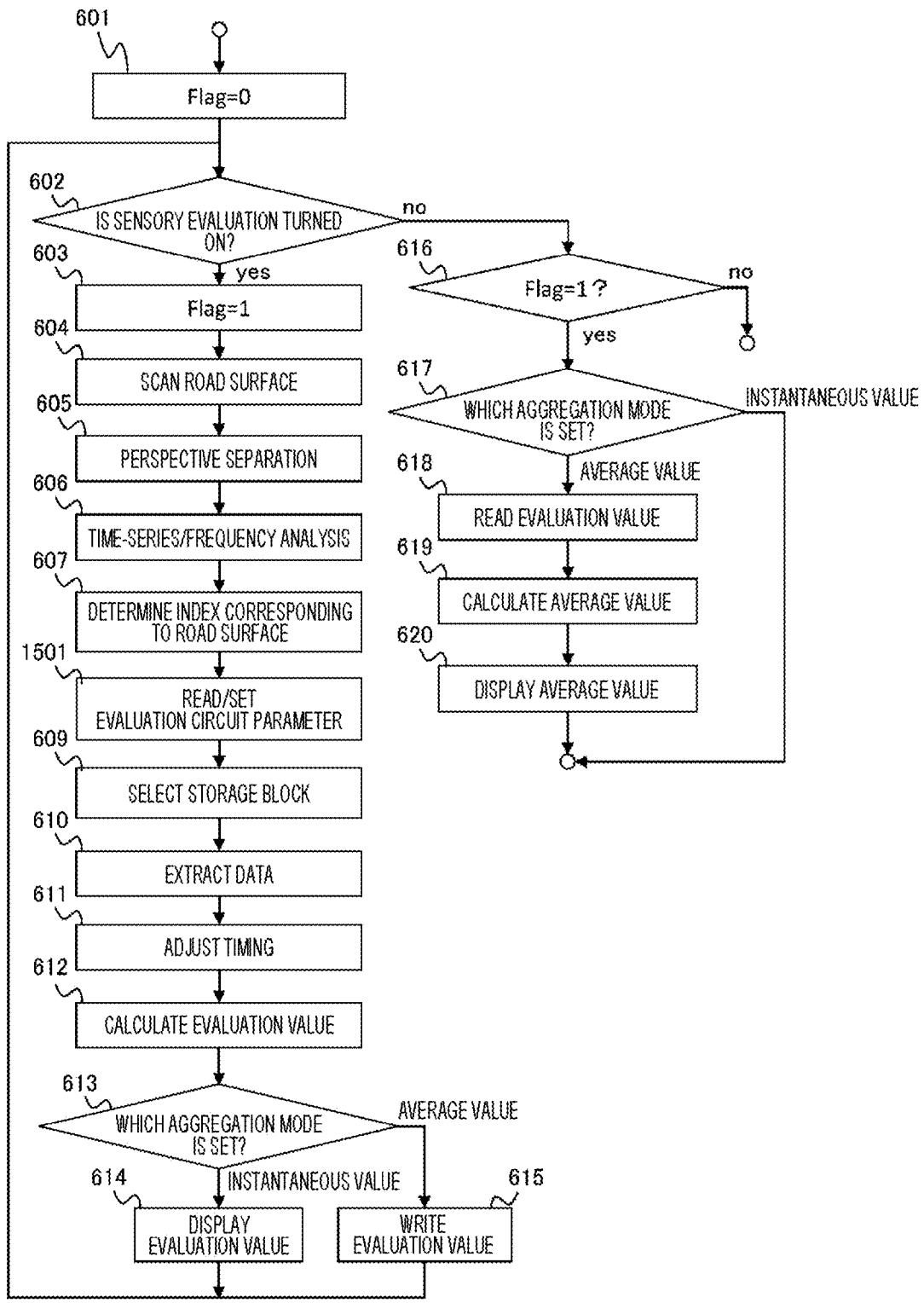
FIG. 15 is a flowchart illustrating a processing flow of the sensory evaluation system according to the third embodiment of the present invention.

FIG. 15 is a flowchart illustrating a processing flow of the sensory evaluation system according to the third embodiment of the present invention. The flowchart of FIG. 15 is different from the flowchart of FIG. 1 described in the first embodiment in that Step 1501 is provided instead of Step 608. Note that a description other than these processing steps different from those in the first embodiment will be omitted hereinafter unless otherwise necessary.

In Step 1501, the control unit 103 reads a weight parameter of an evaluation circuit corresponding to a sensory index selected as an evaluation index in Step 607 from the weight parameter storage unit 109. Then, the read weight parameter is set in the evaluation circuit 1303. As a result, the evaluation circuit 1303 is adjusted according to the evaluation index in the evaluation unit 1302.

In Step 612, the evaluation circuit 1303 adjusted according to the evaluation index in Step 1501 calculates an evaluation value for the evaluation index based on evaluation data input from the data adjustment unit 119 in Step 611.

According to the third embodiment of the present invention described above, the following operational effects are obtained in addition to the operational effects similar to those of the first embodiment.

(7) The evaluation unit 1302 includes the evaluation circuit 1303 corresponding to a plurality of sensory indexes in common, adjusts the evaluation circuit 1303 according to an evaluation index (Step 1501), and calculates an evaluation value using the adjusted evaluation circuit 1303 (Step 612). Specifically, the evaluation circuit 1303 is constructed using a neural network in which a plurality of elements are hierarchically coupled, and adjusts a weight parameter per element according to the evaluation index. In this manner, a circuit scale can be reduced.

Fourth Embodiment

A fourth embodiment of the present invention will be described hereinafter with reference to FIG. 16. In the present embodiment, an example in which a suspension device is manufactured using a sensory evaluation system will be described.

Figure 16:
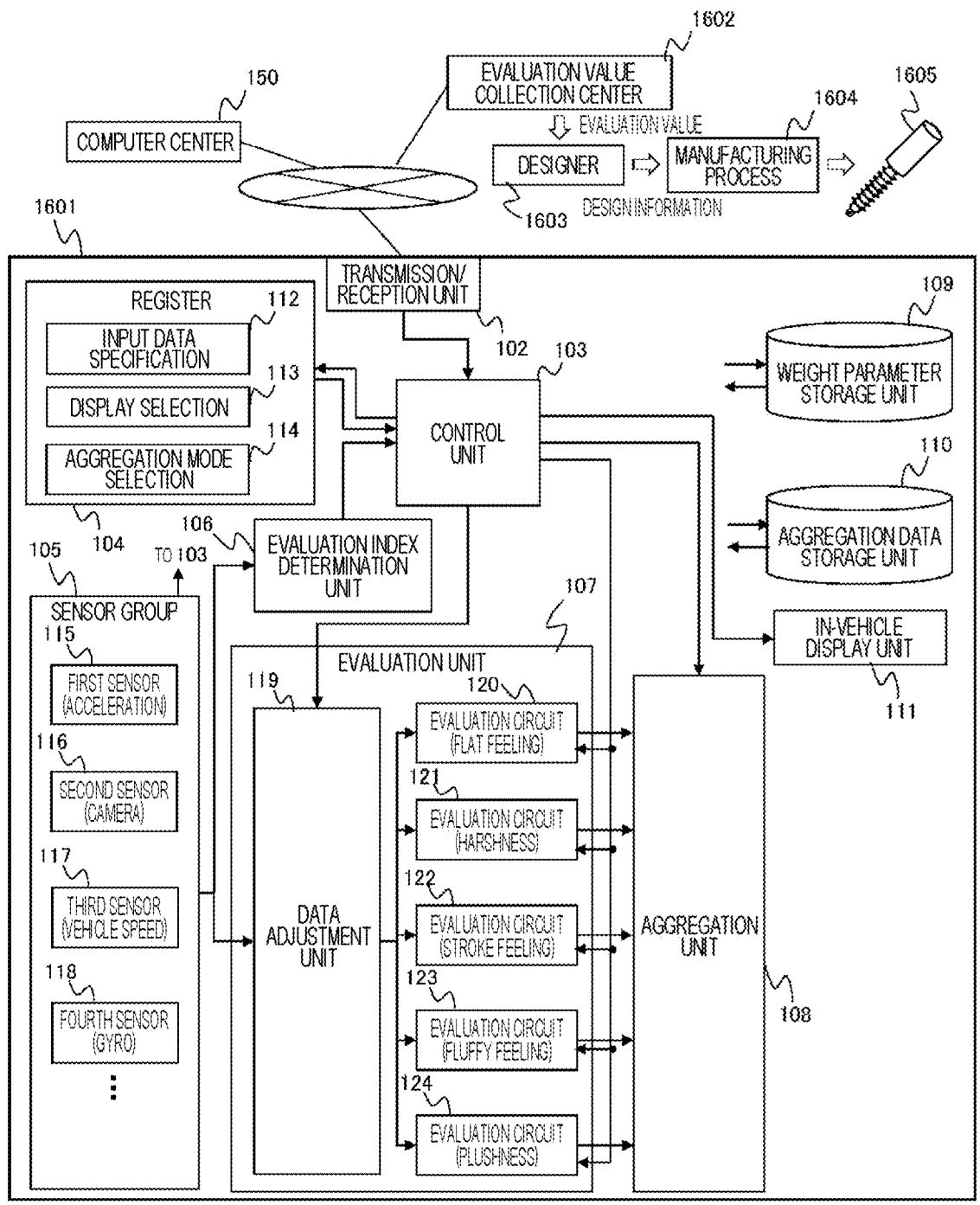
FIG. 16 is a block diagram illustrating a functional configuration of a sensory evaluation system according to a fourth embodiment of the present invention.

FIG. 16 is a block diagram illustrating a functional configuration of the sensory evaluation system according to the fourth embodiment of the present invention. A sensory evaluation system 1601 illustrated in FIG. 16 is different from the sensory evaluation system 101 of FIG. 1 described in the first embodiment in that an evaluation value collection center 1602 is further connected via a network. Note that a configuration and an operation of the sensory evaluation system 1601 are similar to those of the sensory evaluation system 101.

The evaluation value collection center 1602 collects evaluation values for the respective sensory indexes calculated and aggregated by the sensory evaluation system 1601 while a host vehicle travels on various roads, and provides the evaluation values to a designer 1603. Note that the evaluation value collection center 1602 may be connected to a plurality of the sensory evaluation systems 1601 mounted on different vehicles, and evaluation values may be collected from the respective sensory evaluation systems 1601. The designer 1603 who is provided with the evaluation value from the evaluation value collection center 1602 designs a suspension device 1605 with reference to the evaluation value, and provides design information to a manufacturing process 1604. In the manufacturing process 1604 to which the design information is provided, the suspension device 1605 is manufactured using the design information. As a result, the suspension device 1605 can be manufactured based on the evaluation value output from the sensory evaluation system 1601.

Note that the example has been described in which the suspension device 1605 is manufactured using the evaluation value output from the sensory evaluation system 1601 similar to the sensory evaluation system 101 described in the first embodiment in the above description. However, the sensory evaluation system 1601 may be configured similarly to the sensory evaluation systems 1101 and 1301 described in the second and third embodiments, and the suspension device 1605 may be manufactured using an evaluation value output from this sensory evaluation system 1601.

According to the fourth embodiment of the present invention described above, the suspension device 1605 is manufactured based on the evaluation value output from the sensory evaluation system 1601. In this manner, the suspension device 1605 can be manufactured by easily reflecting the evaluation value per sensory index acquired for various roads, it is possible to provide the suspension device that has high performance in terms of improving ride comfort.

Fifth Embodiment

A fifth embodiment of the present invention will be described hereinafter with reference to FIG. 17. In the present embodiment, an example of a control system capable of adjusting a damping force of a suspension device using a sensory evaluation system will be described.

Figure 17:
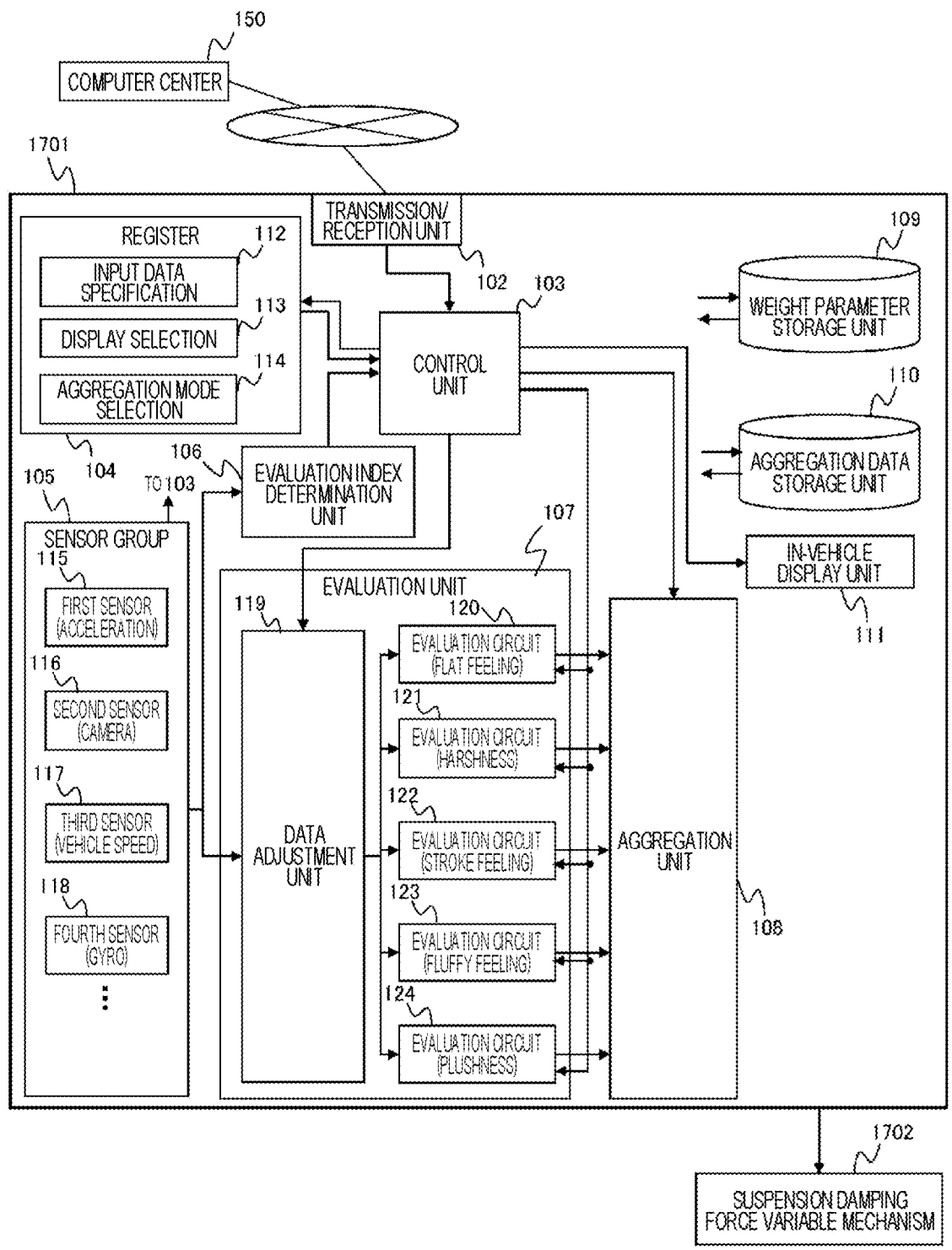
FIG. 17 is a block diagram illustrating a functional configuration of a suspension control system according to a fifth embodiment of the present invention.

FIG. 17 is a block diagram illustrating a functional configuration of a suspension control system according to the fifth embodiment of the present invention. The suspension control system illustrated in FIG. 17 includes a sensory evaluation system 1701 and a suspension damping force variable mechanism 1702. Note that a configuration and an operation of the sensory evaluation system 1701 are similar to those of the sensory evaluation system 101 of FIG. 1 described in the first embodiment.

The suspension damping force variable mechanism 1702 adjusts the damping force of the suspension device (not illustrated) mounted on a host vehicle based on an evaluation value for each sensory index output from the sensory evaluation system 1701. For example, a control command value or a control parameter according to the evaluation value is set for the suspension device capable of adjusting the damping force according to a control command value or a control parameter input from the outside. As a result, the suspension device can be adjusted by reflecting a sensory evaluation result obtained by the sensory evaluation system 1701.

In general, in the suspension device, damping force characteristics change according to oil leakage or aging of mechanical characteristics, which affects ride comfort of an automobile in some cases. Thus, when a change of the evaluation value under a similar traveling environment is detected in the automobile equipped with the sensory evaluation system 1701, the damping force of the suspension device is adjusted in a direction of canceling such a change by the suspension damping force variable mechanism 1702 in the suspension control system of the present embodiment. As a result, even when a failure or deterioration occurs in the suspension device, suspension characteristics can be corrected, and thus, the use time of the suspension device can be extended. Furthermore, the suspension characteristics may be changed according to a type of a road surface on which the host vehicle travels. In this manner, the optimum ride comfort can be always provided regardless of the type of the road surface.

Note that the example has been described in which the damping force of the suspension device is adjusted by the suspension damping force variable mechanism 1702 using the evaluation value output from the sensory evaluation system 1701 similar to the sensory evaluation system 101 described in the first embodiment in the above description. However, the sensory evaluation system 1701 may be configured similarly to the sensory evaluation systems 1101 and 1301 described in the second and third embodiments, and the damping force of the suspension device may be adjusted using an evaluation value output from this sensory evaluation system 1701.

According to the fifth embodiment of the present invention described above, the suspension control system includes: the sensory evaluation system 1701; and the suspension damping force variable mechanism 1702 that adjusts the damping force of the suspension device mounted on the host vehicle based on the evaluation value output from the sensory evaluation system 1701. In this manner, it is possible to provide the suspension device capable of extending the use time of the suspension device and providing the optimum ride comfort regardless of the type of the road surface.

The above-described respective embodiments and various modifications are merely examples, and the present invention is not limited to these contents unless the features of the invention are impaired. In addition, the various embodiments and modifications have been described as above, but the present invention is not limited to these contents. Other aspects that can be considered within the scope of the technical ideas of the present invention are also included in the scope of the present invention.

The disclosed content of the following priority application is incorporated herein as the citation.

Japanese Patent Application No. 2019-66885 (filed on Mar. 29, 2019)

REFERENCE SIGNS LIST

101, 1101, 1301, 1601, 1701 sensory evaluation system
102 transmission/reception unit
103 control unit
104 register
105, 1102 sensor group
106, 1103 evaluation index determination unit
107, 1302 evaluation unit
108 aggregation unit
109 weight parameter storage unit
110 aggregation data storage unit
111 in-vehicle display unit
112 input data specification register
113 display selection register
114 aggregation mode selection register
115 first sensor
116 second sensor
117 third sensor
118 fourth sensor
119 data adjustment unit
120, 121, 122, 123, 124, 1303 evaluation circuit
150, 1104 computer center
1105 map storage unit
1106 fifth sensor
1602 evaluation value collection center
1603 designer 1604 manufacturing process
1605 suspension device
1702 suspension damping force variable mechanism

The invention claimed is:

1. A system for performing sensory evaluation on a plurality of sensory indexes corresponding to respective feelings of an occupant according to traveling of a moving body, the system comprising:
   one or more sensors to acquire information according to the traveling of the moving body, the information including (i) road surface information on a road surface on which the moving body travels and (ii) at least one of acceleration information on an acceleration of the moving body and angular velocity information on an angular velocity of the moving body; and
   one or more microcomputers configured to:
      generate evaluation data to be used for the sensory evaluation, based on the information by:
         generating time-series data of at least one of the acceleration information and the angular velocity information as the evaluation data; and
         making at least one of a time range and a time interval of the time-series data different for each of a plurality of evaluation circuits;
      select, based on the road surface information, at least one sensory index as an evaluation index from among the plurality of sensory indexes;
      calculate evaluation values for the evaluation indexes from the evaluation data using the evaluation circuits corresponding to the evaluation indexes;
      aggregate the evaluation values; and
      output or display a result of the aggregated evaluation values.

2. The system according to claim 1, wherein the one or more microcomputers are configured to:
   select the evaluation index based on a preset relationship between the road surface information and the evaluation index or a relationship between the road surface information and the evaluation index learned by learning.

3. The system according to claim 1, further comprising:
   the plurality of evaluation circuits, wherein the plurality of evaluation circuits correspond to the plurality of respective sensory indexes,
   wherein the one or more microcomputers are configured to select an evaluation circuit corresponding to the evaluation index from among the plurality of evaluation circuits, and calculate the evaluation value using the selected evaluation circuit.

4. The system according to claim 1, wherein an evaluation circuit of the plurality of evaluation circuits corresponds to at least one of the plurality of sensory indexes,
   wherein the one or more microcomputers are configured to adjust the evaluation circuit according to the evaluation index to provide an adjusted evaluation circuit, and calculate the evaluation value using the adjusted evaluation circuit.

5. The system according to claim 4, wherein
   the evaluation circuit is constructed using a neural network in which one or more elements of a plurality of elements are hierarchically coupled, and adjusts a weight parameter for each of the one or more elements according to the evaluation index.

6. The system according to claim 1, wherein
   the one or more microcomputers are configured to set either a first aggregation mode or a second aggregation mode,
   and output an instantaneous value or a time average value of the evaluation value for the evaluation index when the first aggregation mode is set, and
   the one or more microcomputers are configured to aggregate and output an average value of the evaluation values for each of the evaluation indexes during traveling of the moving body in a predetermined road section when the second aggregation mode is set.

7. A suspension device manufactured based on the evaluation value output from the system according to claim 1.

8. A suspension control system comprising:
   the system according to claim 1; and
   a suspension damping force variable mechanism that adjusts a damping force of a suspension device mounted on the moving body based on the evaluation value output from the system according to claim 1.

* * * * *